United States Patent [19]
Panzarella et al.

[11] Patent Number: 5,416,776
[45] Date of Patent: May 16, 1995

[54] MODEM BACKPLANE TECHNIQUES

[75] Inventors: Russell C. Panzarella, Morton Grove; Scot W. Salzman, Vernon Hills, both of Ill.

[73] Assignee: U.S. Robotics, Inc., Skokie, Ill.

[21] Appl. No.: 250,276

[22] Filed: May 27, 1994

[51] Int. Cl.[6] .............................................. H04B 1/40
[52] U.S. Cl. ............................... 370/85.11; 375/222; 379/93
[58] Field of Search .................... 375/7, 8, 36, 38, 121; 379/93; 361/393, 394, 413, 415; 370/33, 84, 85.9, 85.11, 119

[56] References Cited

U.S. PATENT DOCUMENTS

| | | | |
|---|---|---|---|
| 4,587,651 | 5/1986 | Nelson et al. | 370/85.12 |
| 4,864,587 | 9/1989 | Giorgio | 375/38 |
| 4,955,020 | 9/1990 | Stone et al. | 375/36 |
| 5,025,500 | 6/1991 | Phinney | 375/8 |
| 5,151,896 | 9/1992 | Bowman et al. | 370/85.13 |
| 5,157,658 | 10/1992 | Arai et al. | 375/8 |
| 5,166,931 | 11/1992 | Riddle | 370/94.1 |
| 5,202,884 | 4/1993 | Close et al. | 375/8 |
| 5,303,266 | 4/1994 | Budin et al. | 375/36 |

OTHER PUBLICATIONS

"Draft Standard For a Simple 32-Bit Backplane Bus: NuBus," *IEEE Computer Society Press*, Nov. 21, 1990.

*Primary Examiner*—Benedict V. Safourek
*Attorney, Agent, or Firm*—Allegretti & Witcoff, Ltd.

[57] ABSTRACT

An improved backplane apparatus for transmitting signals to and from a modem system. The modem system includes more than one modem for transmitting data via at least one telephone line and via at least one network. The modem system has a first bus for management signal communication with the modems at a predetermined first data rate, and a second bus for transmitting data between the telephone line and the modems at a predetermined second data rate greater than the first data rate. The modem system also has a third bus for transmitting data between the modems and the network at a predetermined third data rate greater than the second data rate, and a fourth bus for distributing DC power and ground potential. The modem system defines a first impedance for terminating the first bus, a second impedance for terminating the second bus, and a third impedance for terminating the third bus. Finally, the modem system has structure for spacing the busses in layers in the backplane dependent on the data rate of the bus, and a plurality of connector assemblies for interconnecting circuit boards with the busses. Each connector assembly comprises an array of connectors arranged in rows and columns. The connectors are coupled to the busses according to a predetermined pattern dependent on the data rate of the bus, whereby the number of connector assemblies coupled to the first, second and third busses can be increased.

15 Claims, 25 Drawing Sheets

Fig. 2

| Fig. 2A | Fig. 2B | Fig. 2C |
|---|---|---|

Fig. 3

| Fig. 3A | Fig. 3C | Fig. 3E |
|---|---|---|
| Fig. 3B | Fig. 3D | Fig. 3F |

Fig. 4

| Fig. 4A | Fig. 4B | Fig. 4C |
|---|---|---|

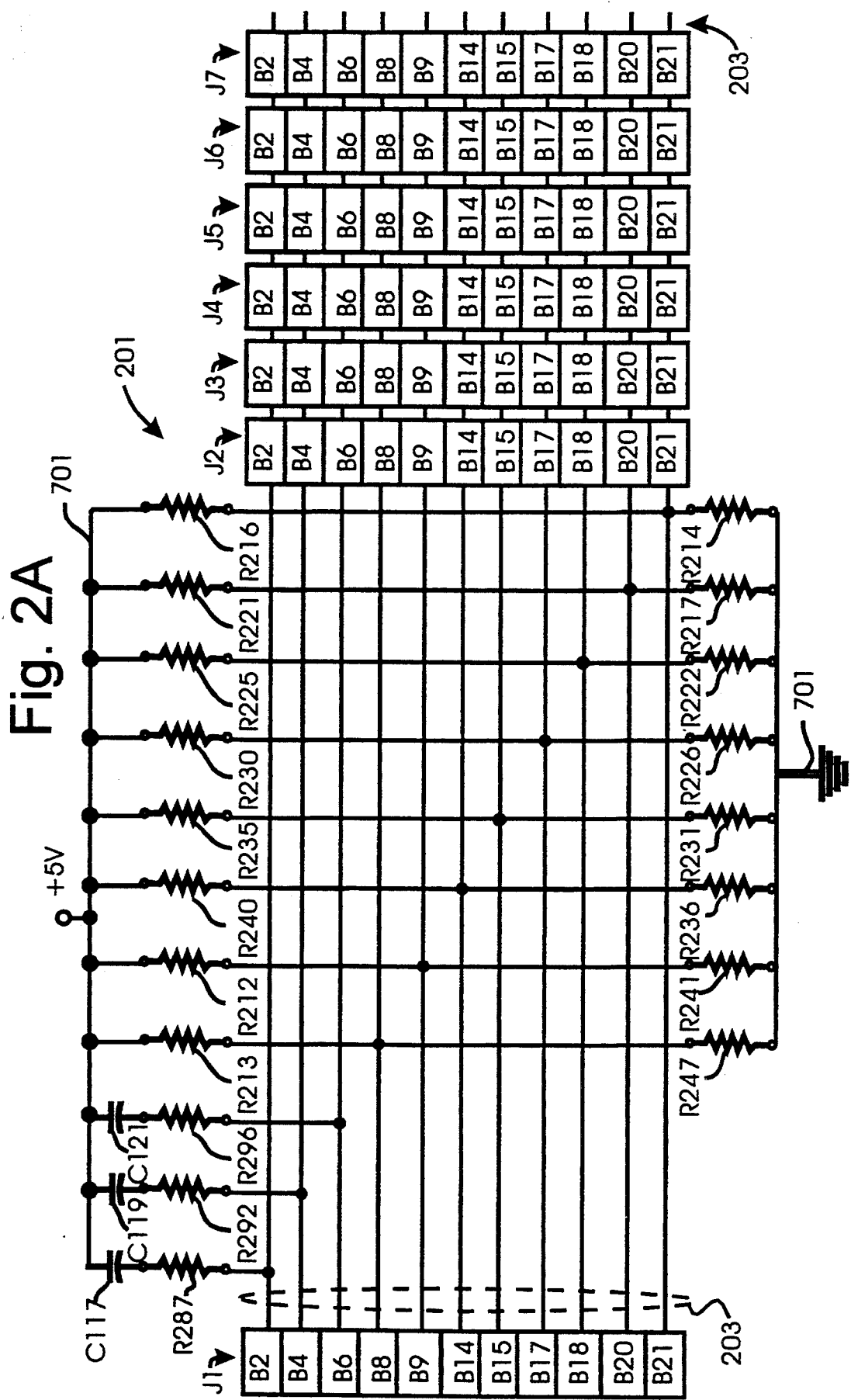

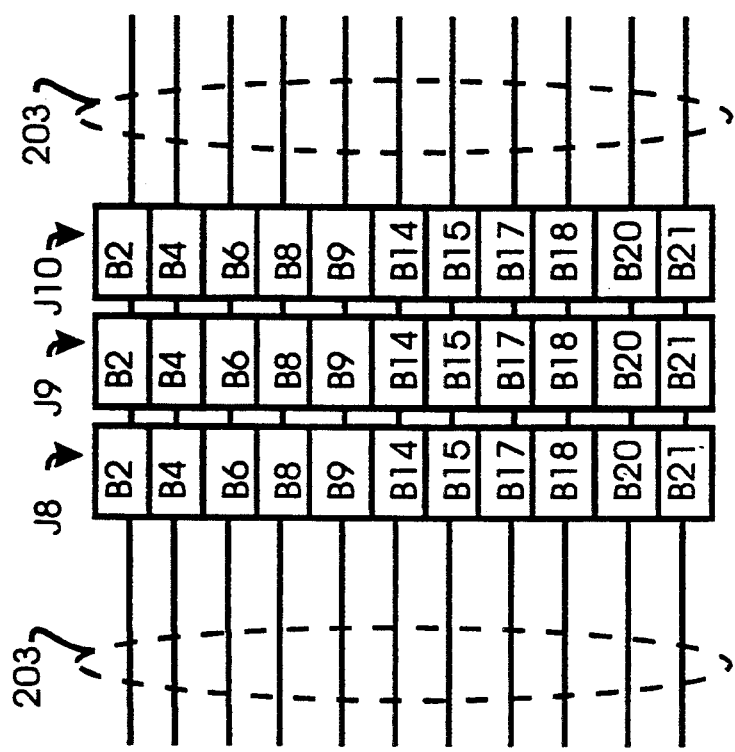

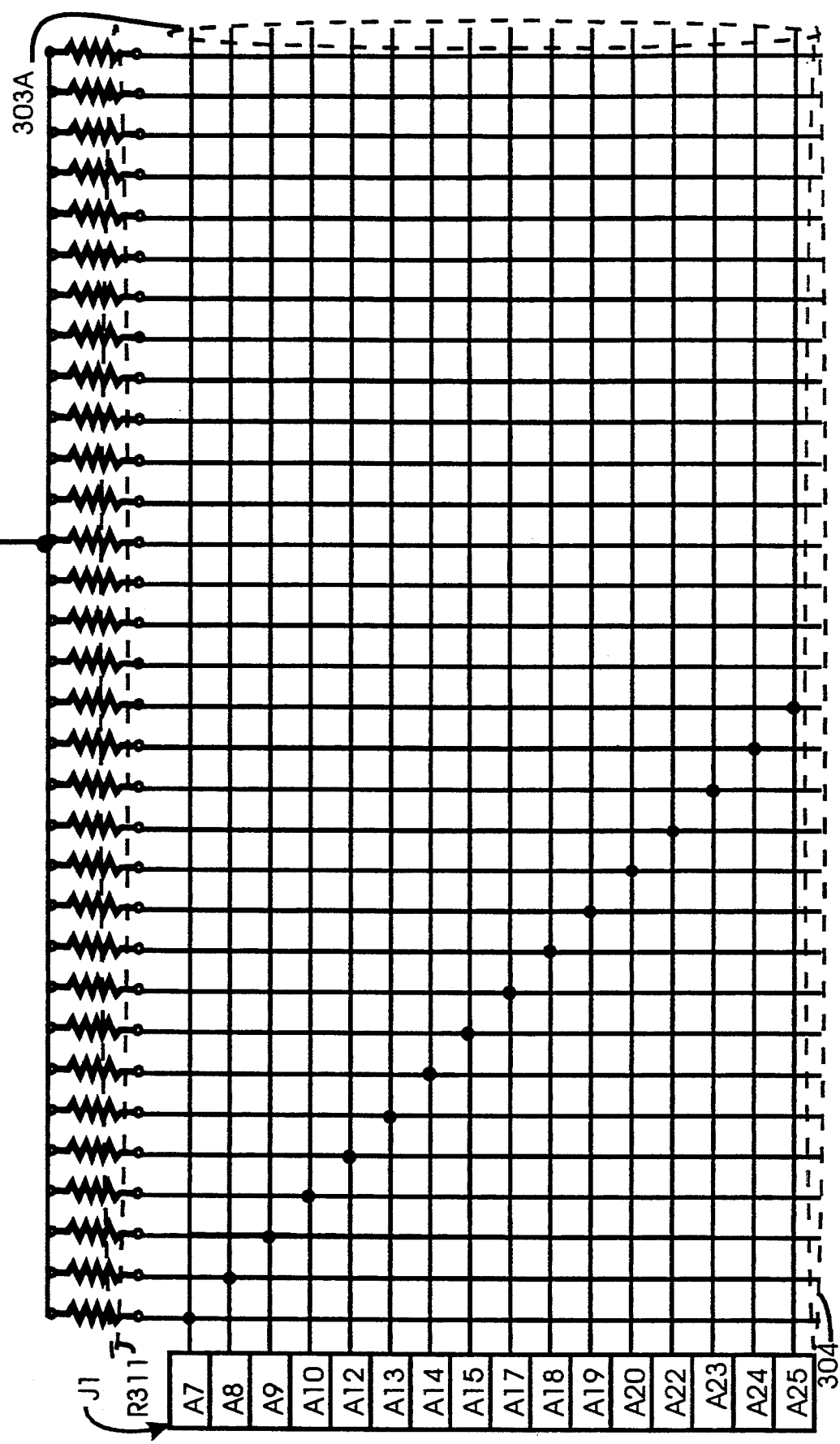

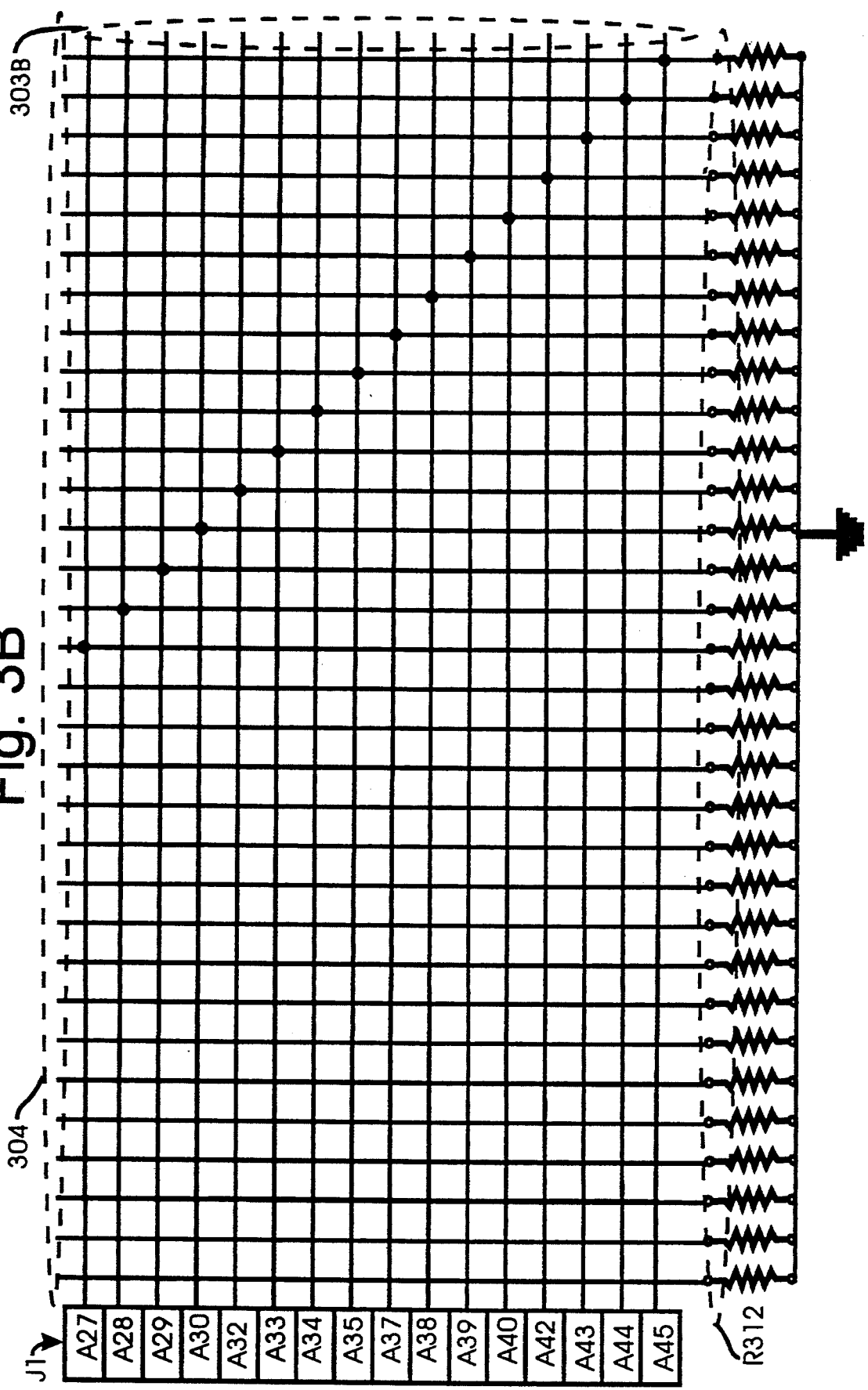

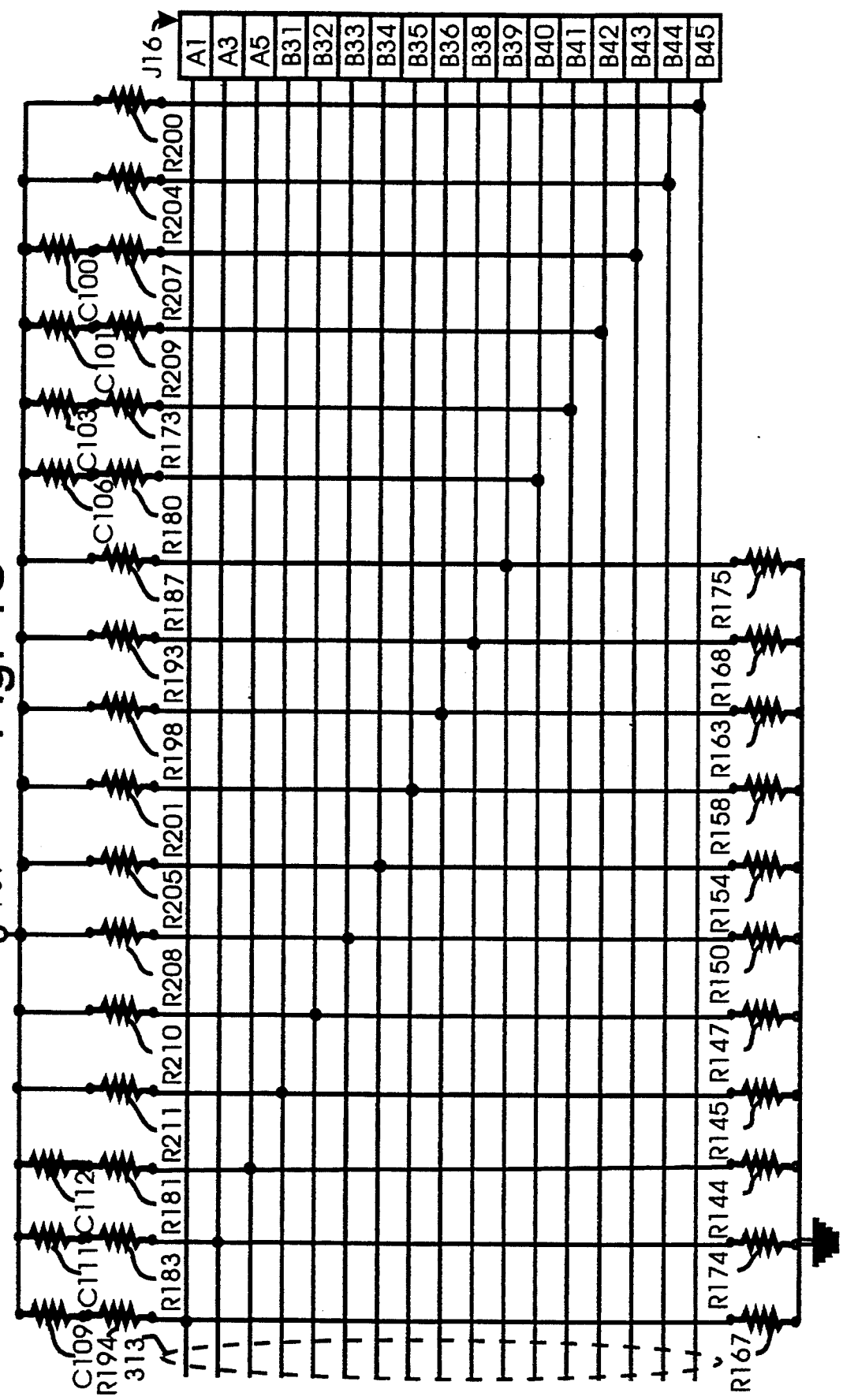

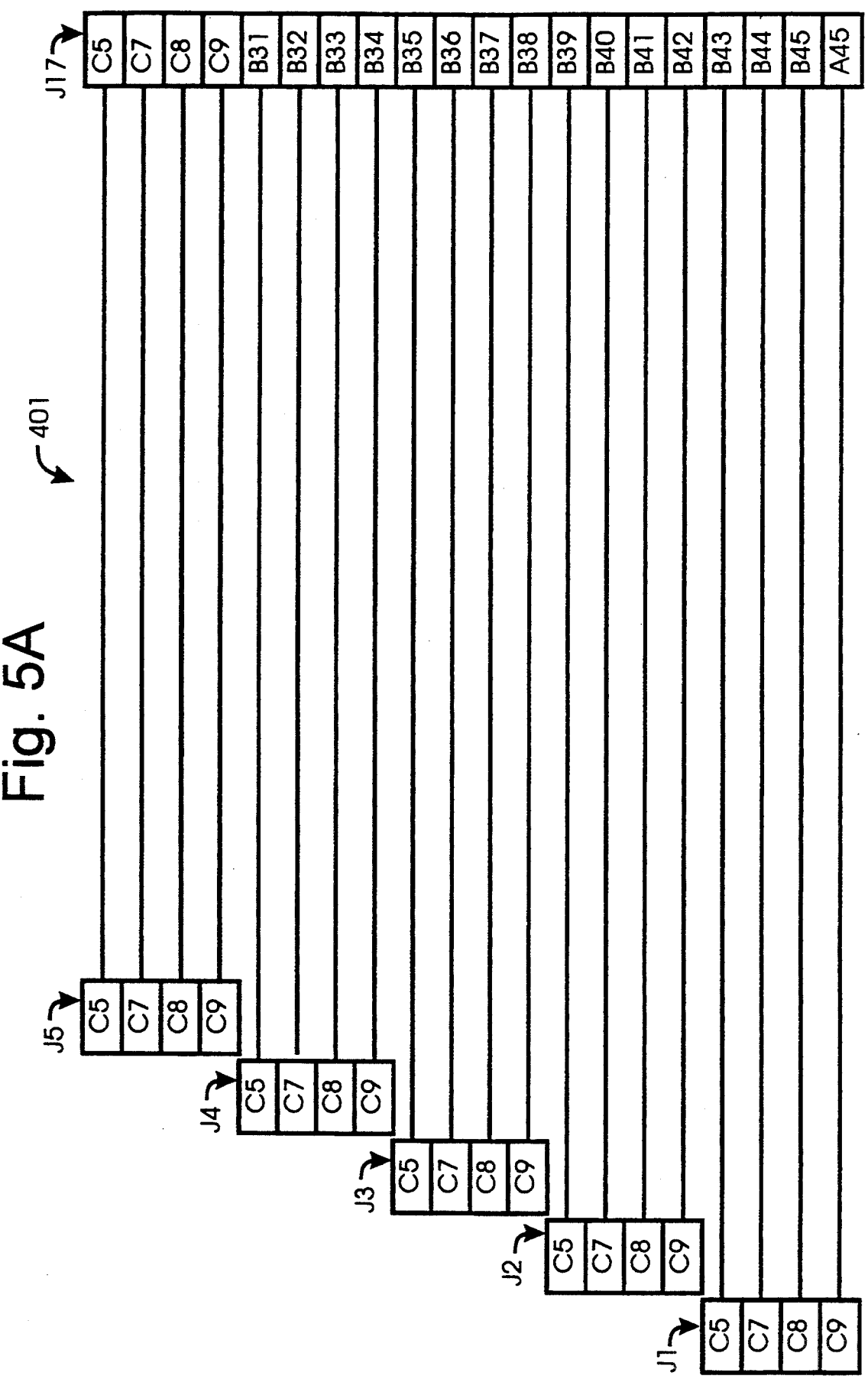

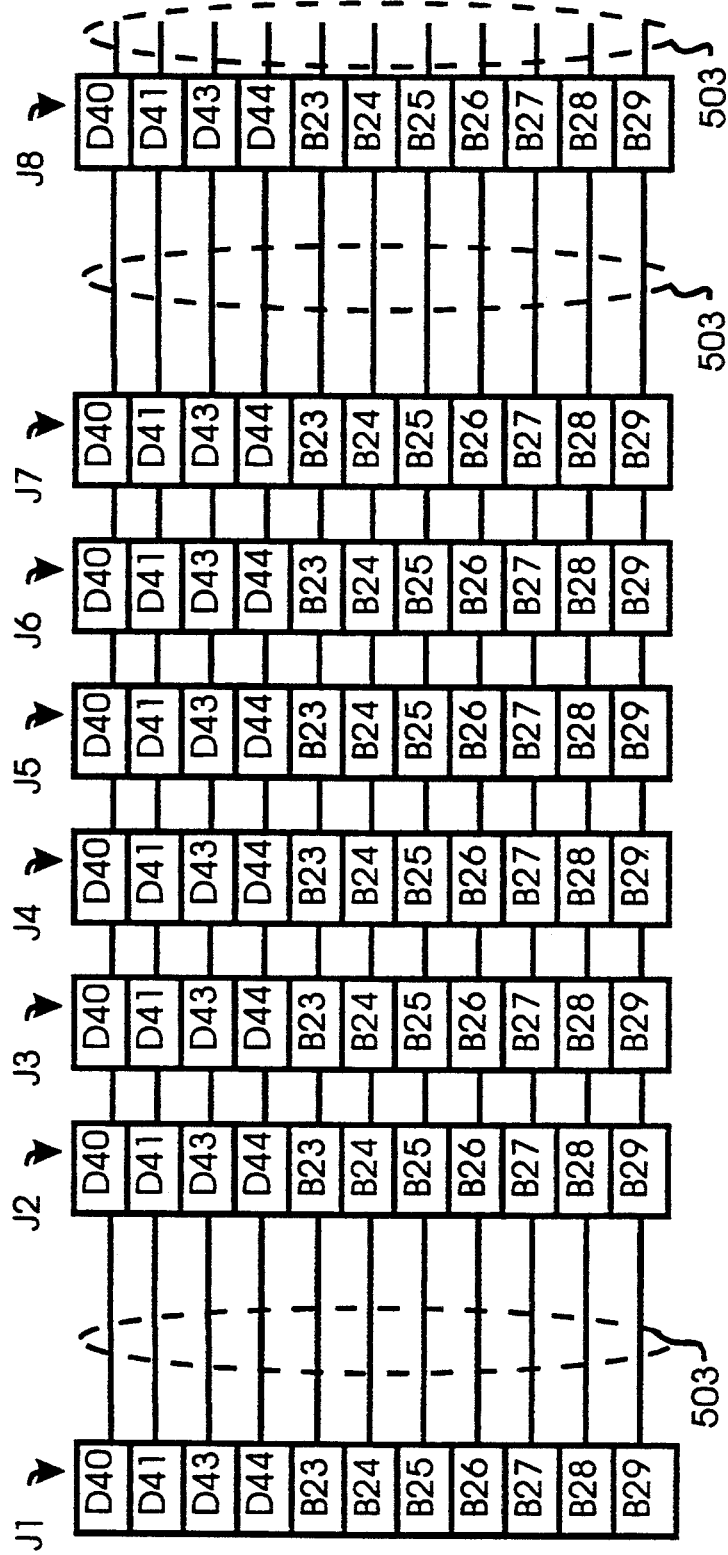

MODEM BACKPLANE TECHNIQUES

FIELD OF THE INVENTION

This invention relates to backplane or midplane boards for modem communication, and more particularly relates to such boards embodying multiple networks and busses.

DESCRIPTION OF THE PRIOR ART

Multiple modems have been employed in a single chassis in the past. Such chassis typically have used circuit boards and backplanes to interconnect the modems with each other and with related circuitry. However, in such chassis, the ability of the modems to communicate with each other and with the related circuits has been limited by the inability of the backplanes to accommodate high speed networks and busses. In particular, in order to maintain the performance of high speed networks, prior backplanes have been unable to utilize a sufficient number of connectors to accommodate all of the modems and related circuits that should placed in a single chassis.

SUMMARY OF THE INVENTION

In order to overcome the deficiencies of the prior art, a primary object of the invention is to provide a backplane circuit board capable of enabling high speed network communication among a larger number of modems and related circuits than can be accommodated by the known backplane circuit boards.

Another object of the invention is to enable an efficient pin arrangement that facilitates high speed communication and conserves the number of pins required for circuit boards that are interconnected by a backplane or midplane circuit board.

The invention is useful in a modem system comprising a plurality of modems for modulating and demodulating data, transmitting the data via at least one telephone line and via at least one network. The applicants have discovered improved backplane apparatus for transmitting signals related to the modems in such a system. The backplane preferably comprises first bus means for management signal communication with the modems at a predetermined first data rate, second bus means for transmitting data between the telephone line and the modems at a predetermined second data rate greater than said first data rate, third bus means for transmitting data between the modems and the network at a predetermined third data rate greater than said second data rate, and fourth bus means for distributing DC power and ground potential. The backplane also comprises first, second and third impedance means for terminating the first, second and third bus means, respectively. The backplane also comprises means for spacing the first, second, third and fourth bus means in layers dependent on the data rate of the bus means. A plurality of connector means interconnect circuit boards with the first, second, third and fourth bus means. Each of the connector means comprises an array of connectors arranged in rows and columns. The connectors are coupled to the first, second, third and fourth bus means according to a predetermined pattern dependent on the data rate of the bus means.

By using the foregoing type of backplane, the number of connector means coupled to the first, second and third bus means can be increased. This feature offers distinct advantages for chassis requiring a substantial number of modems and related circuit boards.

BRIEF DESCRIPTION OF THE DRAWINGS

These and other objects, advantages and features of the invention will appear for purpose of illustration, but not of limitation, in connection with FIGS. 1-10, wherein like numbers refer to like parts throughout and in which:

FIG. 2 illustrates the arrangement of FIGS. 2A-2C;

FIGS. 2A-2C are schematic diagrams of a preferred form of TDM bus suitable for use in connection with the invention;

FIG. 3 illustrates the arrangement of FIGS. 3A-3C;

FIGS. 3A-3F are schematic diagrams of the data and address lines of a preferred form of packet bus suitable for use in connection with the invention;

FIG. 4 illustrates the arrangement of FIGS. 4A-4C;

FIGS. 4A-4C are schematic diagrams of the control lines of a preferred form of packet bus suitable for use in connection with the invention;

FIGS. 5A-5D are schematic diagrams of a preferred form of a management bus suitable for use in connection with the invention;

FIGS. 6A-6B are schematic diagrams of a preferred form of general purpose bus suitable for use in connection with the invention;

DETAILED DESCRIPTION OF THE PREFERRED EMBODIMENT

Figure 1:
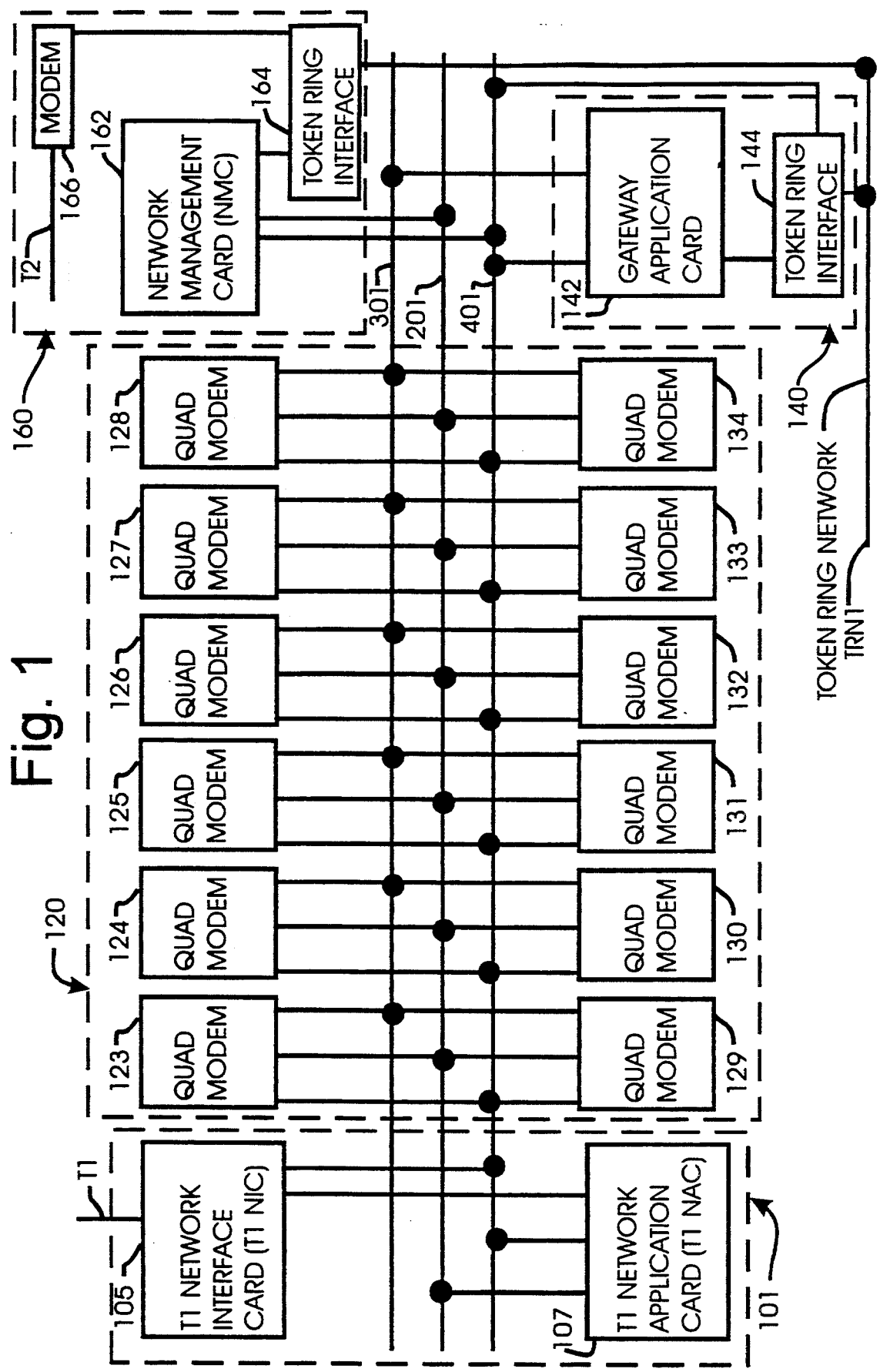
FIG. 1 is a schematic block diagram of a preferred form the network access server in which an embodiment of the invention may be utilized.

Referring to FIG. 1, a preferred embodiment of the invention may be used in connection with a telephone control module 101, a modem module 120, a network control module 140, a management module 160, a TDM bus 201, a packet bus 301, and a management bus 401. Telephone control module 101 comprises a T1 network interface card (T1 NIC) 105 and a T1 network application card (T1 NAC) 107. Modem module 120 comprises identical quad modem NACs 123-134 connected to TDM bus 201 as shown. Network control module 140 comprises a gateway NAC 142 and a token ring interface card 144 connected as shown. Management module 160 comprises a network management card (NMC) 162, a management token ring interface card 164, a modem 166 and a telephone line T2 connected as shown.

T1 NIC 105 has three primary functions:
 (1) to provide the necessary interface for 1.544 MHz telephone span line T1;

(2) to process incoming calls from the telephone company service and connect those calls to modem module 120; and (3) to process outgoing calls from modem module 120 and connect those calls to telephone company service.

T1 NIC 105 provides a CSU interface which recovers clock signals and data from the incoming T1 signals, and also provides the transmission of digital telephone signals representing digital data to line T1. NIC 105 is connected to T1 NAC 107 via a backplane connector. T1 NAC 107 provides framing of recovered T1 data to extract the T1 DS0 channel data and then switches the channel data to quad modem NACs 123-134.

Modem module 120 modulates and demodulates data to enable communication between telephone line T1 and a token ring network TRN1 that may be connected to various computers. Each of the quad modem NACs includes four modems that perform the modulation and demodulation.

Network control module 140 enables communication between modem module 120 and network TRN1 via packet bus 301.

Management module 160 provides various management functions for the NACs (i.e., cards 107, 123-134 and 142) via management bus 401.

Additional details about modules 101, 120, 140 and 160 are provided in pending application Ser. No. 08/212,505, entitled "Telephone Call Routing and Switching Techniques for Data Communications," filed Mar. 11, 1994 and assigned to the same assignee as the present application. Application Ser. No. 08/212,505 is incorporated by reference.

A backplane BP (FIG. 10) is the communications medium which all plug in cards (NACs and NICs) use for communications. The front of the backplane has slots that accept 16 front loading network application cards (NACs) and 1 network management card (NMC) 162 (e.g., 105, 107, 123-134, 142 and 162 (FIG. 1)). Network application cards typically function as intelligent data processors/routers providing a full duplex connection between external networks. Network management card 162 maintains constant communication with all application cards and performs management functions such as configuring cards, performing tests, issuing commands, and generating query statistics.

The rear of the backplane has slots that accept 16 rear loading network interface cards (NICs) (e.g., T1 NIC 105) and 1 management interface card (MIC) (e.g., Token Ring Interface 164). Network interface cards provide the physical hardware interface between the external network and its associated application card. The management interface card provides interface ports enabling NMC 162 to communicate with external devices via network TRN1 or an RS232 interface. All of these slots are interconnected via many signal traces that run along backplane BP. These signals make up the high speed busses that carry data and management traffic to all of the specific application and interface cards.

Backplane BP supports three data busses which are the time division multiplexed, i.e., (TDM) bus 201, packet bus 301, and management bus 401. TDM bus 201 is a serial synchronous bus used for communications between TDM orientated devices (e.g., between the T1 NAC 107 and modem cards 123-134). Packet bus 301 is a 32 bit parallel bus used for communications between packet orientated modules (e.g., between modem cards 123-134 and gateway card 142. Management bus 401 is a serial synchronous bus used for communications between management card 162 and all application and interface cards.

Backplane BP also includes a power bus 701 (FIG. 2A) that distributes power to all of the card slots. Those skilled in the art are capable of laying out power bus 701 and distributing the power bus in layers in backplane BP as described in connection with FIG. 10. This power bus consists of +5 V, −5 V, +12 V, −12 V, and a number of signal and chassis grounds. The power bus not only provides DC voltage sources but also provides a means of isolating high frequency signals.

Application cards not only communicate via backplane BP but also via their respective interface cards. This communication is done through pins on the connectors that are not used by the backplane. These pins will be referred to as front-to-back pins. These pins may be used differently depending on the application. For instance, T1 NAC 107 uses some of these pins to carry T1 clock, data and control signals to T1 NIC 105, while gateway card 142 uses some of these pins to communicate with interface 144 over an AT (ISA) bus.

Backplane BP incorporates other bussed printed circuit board (PCB) tracks for expansion purposes. These tracks, like the common bussed tracks mentioned above, run to all 17 slots of the backplane. However, packet bus 301 is not available to slot J17.

The PCB of backplane BP is a multilayer consisting of signal planes and power planes for a total of 12 layers. Backplane BP is approximately 13.783" wide, 6.575" tall, and 0.190" thick.

The backplane houses 180 pin pressfit connectors J1–J17 for 17 front loading cards and 180 pin pressfit shrouds for 17 rear loading cards. Both front and rear portions of the connectors are of a male gender. Each 180 pin connector consists of 4 rows of 45 pins. These connectors are of a pressfit variety and require no soldering. The connector is first press-fit into the application card side of the backplane forming a single 180 pin connector. The shroud is then pressfit on the interface card side of the backplane. The shroud uses the pin tails of the front connector to form the rear connector. The connector pins are spaced 0.100" from each other making the total length 5.25" and the total width 0.585".

The connectors J1–J17 of backplane BP support extended ground pins which will provide hot-swap capability. Since all slots of the backplane use the same type of connector, there is no provision for keying on any of the 17 slots. The philosophy for the chassis is that any application card can plug into any of the 16 application card slots. Thus, keying is not necessary. Backplane BP requires no hand or wave soldering. The backplane card connectors and power connection fast tabs are all pressfit. The surface mount termination components are installed on both sides of the backplane using a solder reflow process. Connectors J1–J17 used for all the NACs, NICs, NMC and IC require a 40 lbs. per pin maximum pressfit insertion force when pressing them into backplane BP.

All high speed busses on the backplane are terminated at both ends of the backplane. The termination circuits serve to reduce signal reflections and ringing and guarantee signal determinacy during the times that a signal is not being driven by a module. Each termination circuit consists of a pull-up and pull-down resistor resulting in the desired Thevenin equivalent voltage and impedance characteristics.

The surface mount termination components are installed on both sides of the backplane using a solder reflow process. This process consists of two steps: one pass for the top side components and another pass for the bottom side components. The small size of surface mount devices allows each termination to be located very close to the physical end of each bussed line.

Segmentation allows some of the parallel busses to be divided into two sections. TDM bus 201 and the general purpose tracks are brought to the component side surface of the PCB of backplane BP. At manufacturing assembly time, these tracks can be physically cut to divide the busses in two. The traces are exposed to the surface between connectors J8 and J9. Thus, slots 1–8 are one segment while slots 9–17 are the other. Locations for termination components are available at both end of these busses for each segment. Segmentation effectively doubles the bandwidth of the TDM bus and doubles the number of general purpose tracks for applications involving 8 or less cards.

Figure 2C:
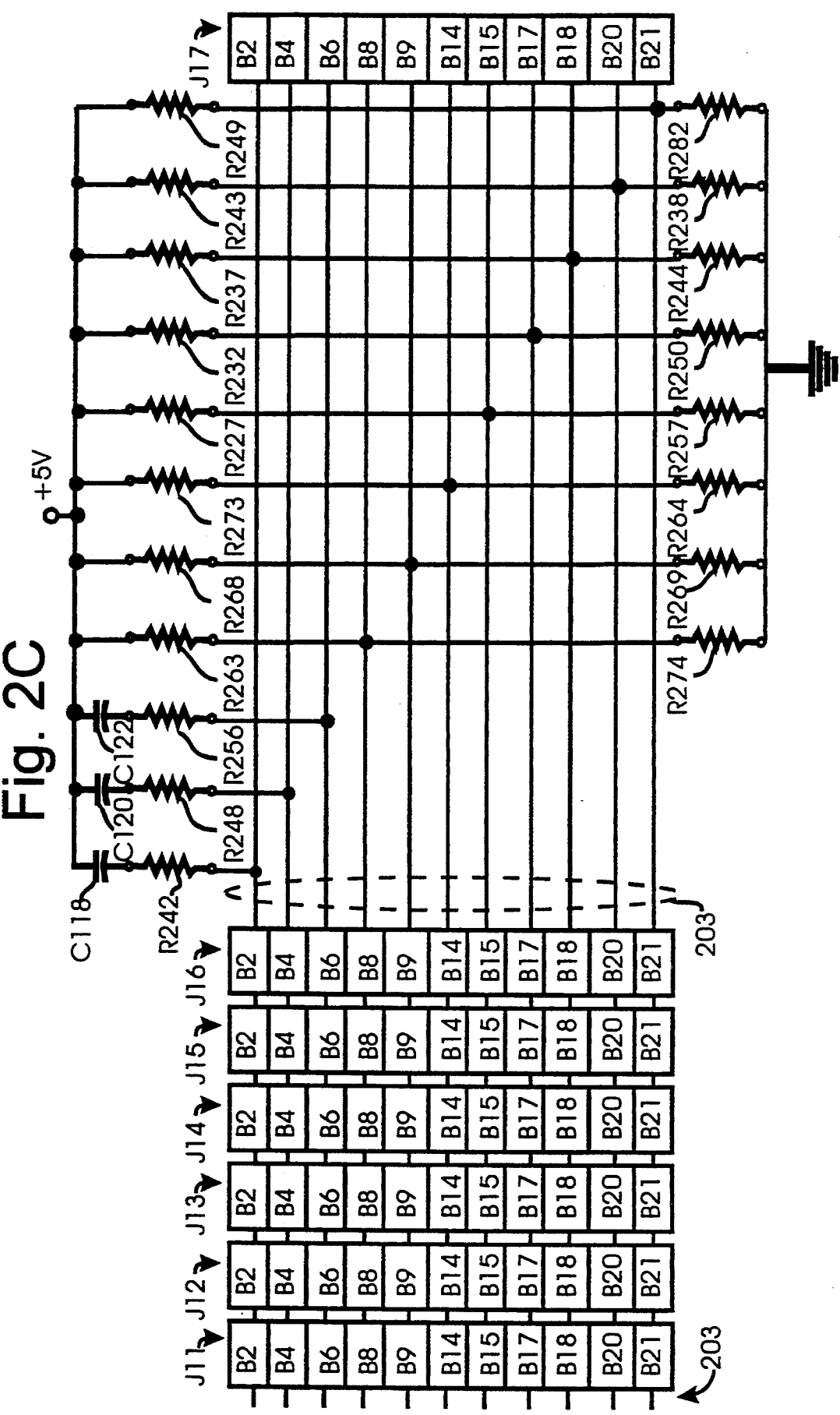

Referring to FIGS. 2A–2C, TDM bus 201 comprises bus conductors 203 that are connected to designated pins of 180 pin connectors J1–J17. The configuration of the pins for the connectors are shown in more detail in connection with FIGS. 8 and 9.

TDM bus 201 includes terminating resistors identified with an "R" prefix and terminating capacitors identified with a "C" prefix. Referring to FIG. 2A, each of resistors R287, R292 and R296 has a value of 75 ohms. Each of resistors R247, R241, R236, R231, R226, R222, R217 and R214 has a value of 470 ohms. Each of the remaining resistors shown in FIG. 2A has a value of 220 ohms. Each of capacitors C117, C119 and C121 has a value of 82 pico farads. Referring to FIG. 2C, each of resistors R242, R248 and R256 has a value of 75 ohms. Each of resistors R274, R269, R264, R257, R250, R244, R238 and R282 has a value of 470 ohms. Each of the remaining resistors shown in FIG. 2C has a value of 220 ohms. Each of capacitors C118, C120 and C122 has a value of 82 pico farads.

TDM bus 201 is a synchronous serial bus providing 256 full duplex 64 Kbps time-slots. This bus is based on the AT&T concentration highway interface (CHI) standard. For information concerning this standard, refer to the document AT&T concentration highway interface (CHI) specification (1990). TDM bus 201 is used to carry traffic between circuit switched type devices. The TDM bus is made up of multiple TDM highways that run to all slots of backplane BP. TDM bus 201 requires 11 pins on all of the slots including the NMC slot. The TDM bus is clocked at 4.096 MHz.

Referring to FIGS. 3A–3F, packet bus 301 comprises bus conductors 303A–303B, as well as terminating conductors 304 and 305, each connected as shown. The conductors are connected to designated pins of connectors J1–J16 as shown and as more specifically described in connection with FIG. 8.

Figure 3C:
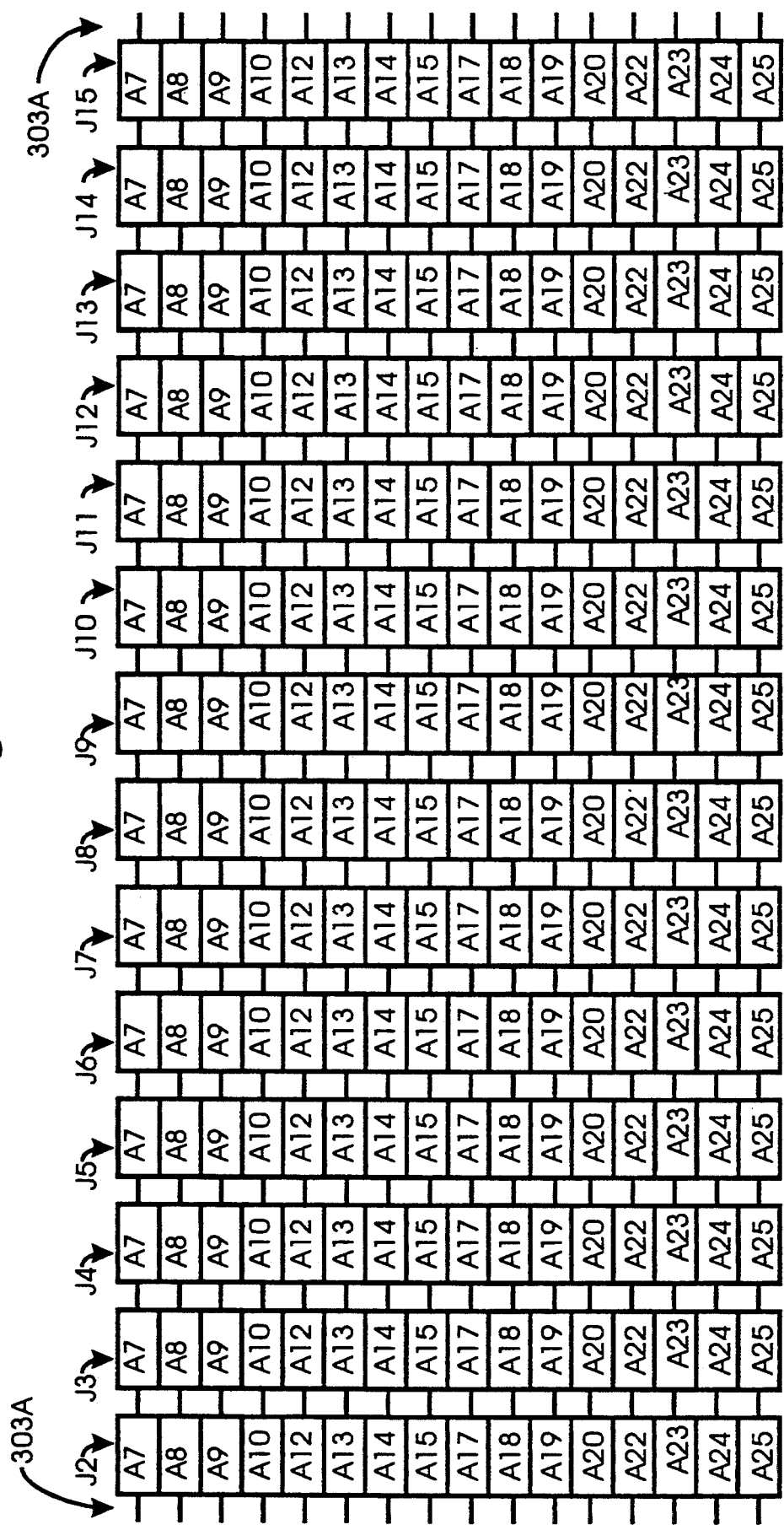
Figure 3D:
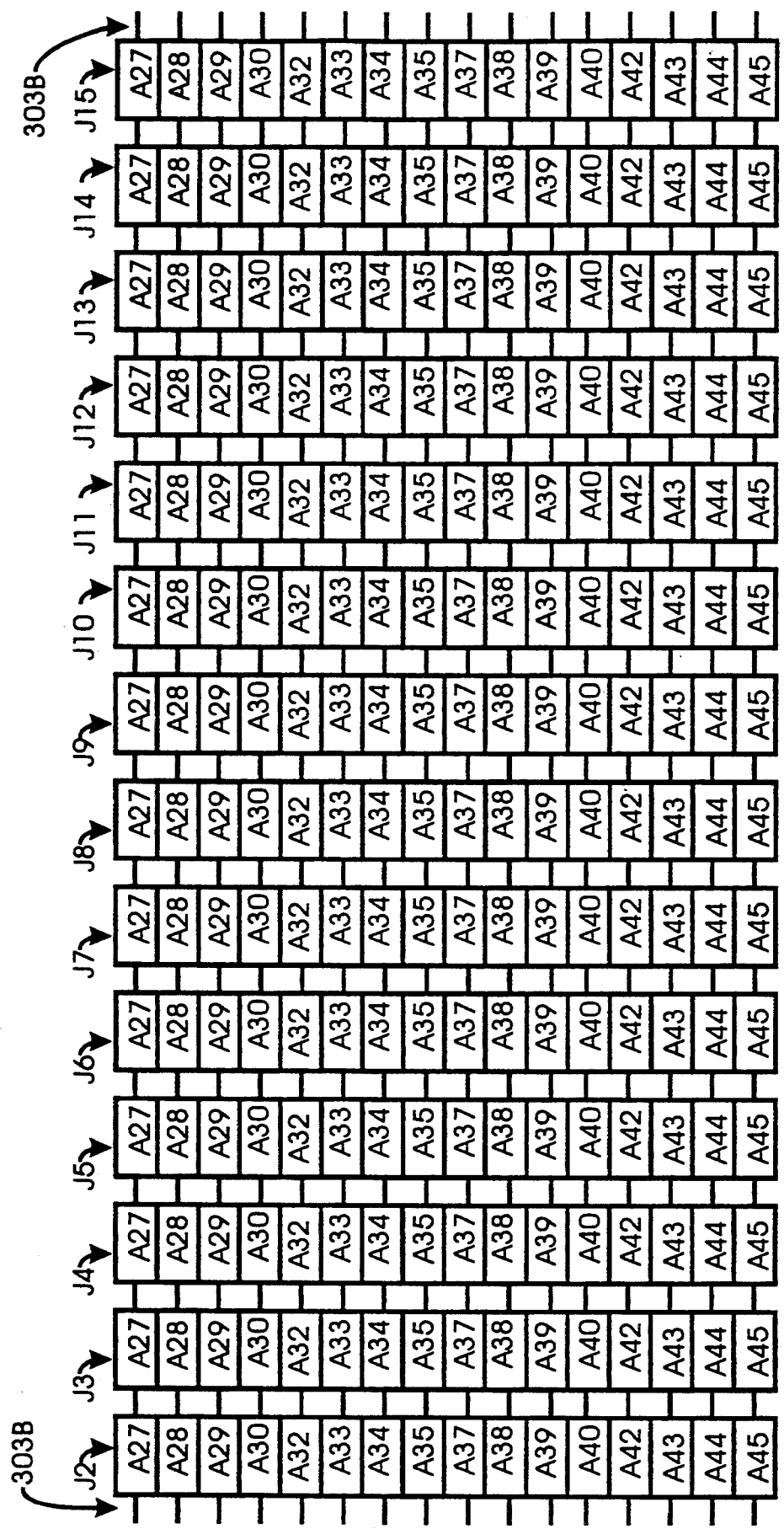
Figure 3E:
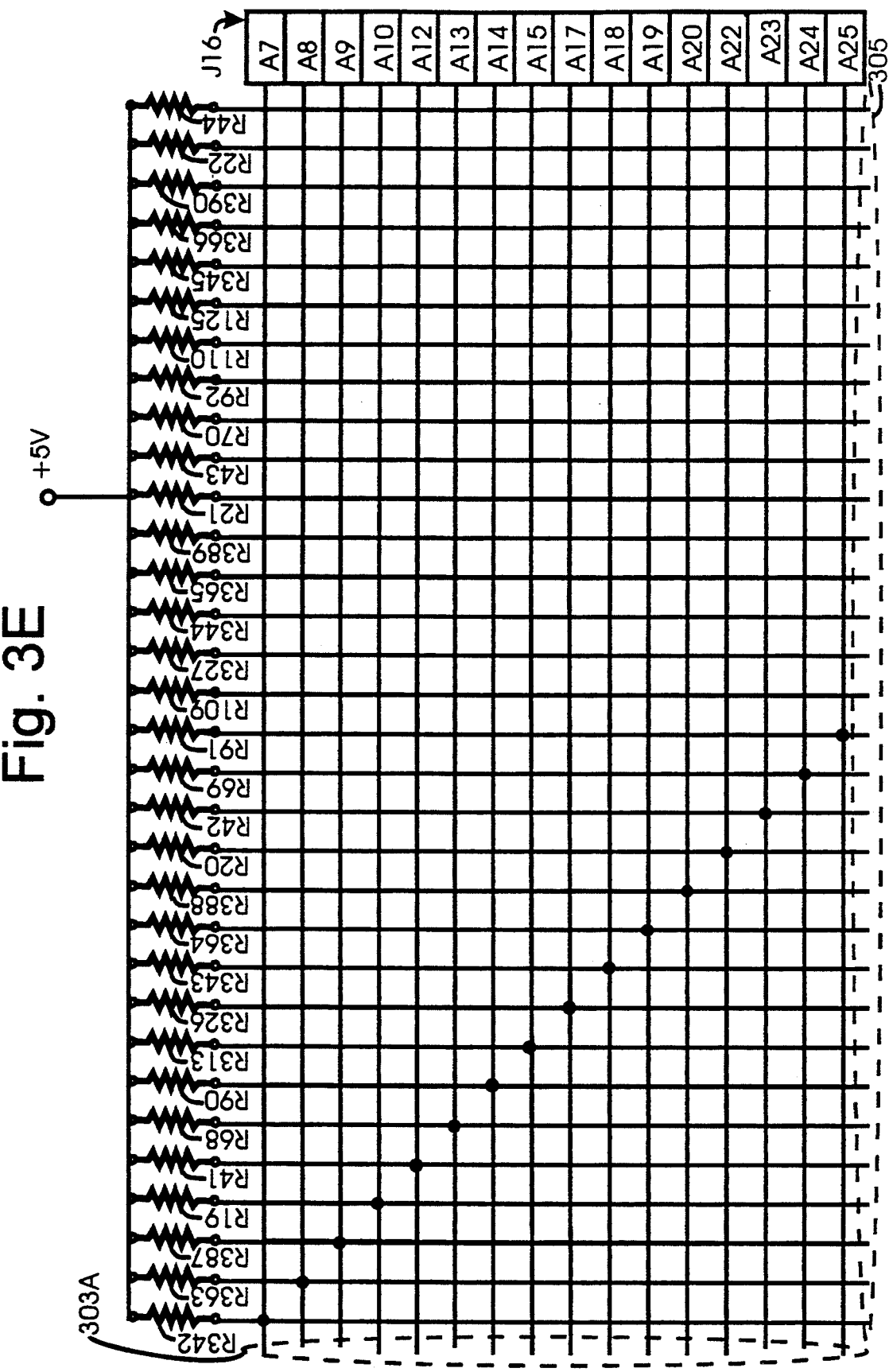
Figure 3F:
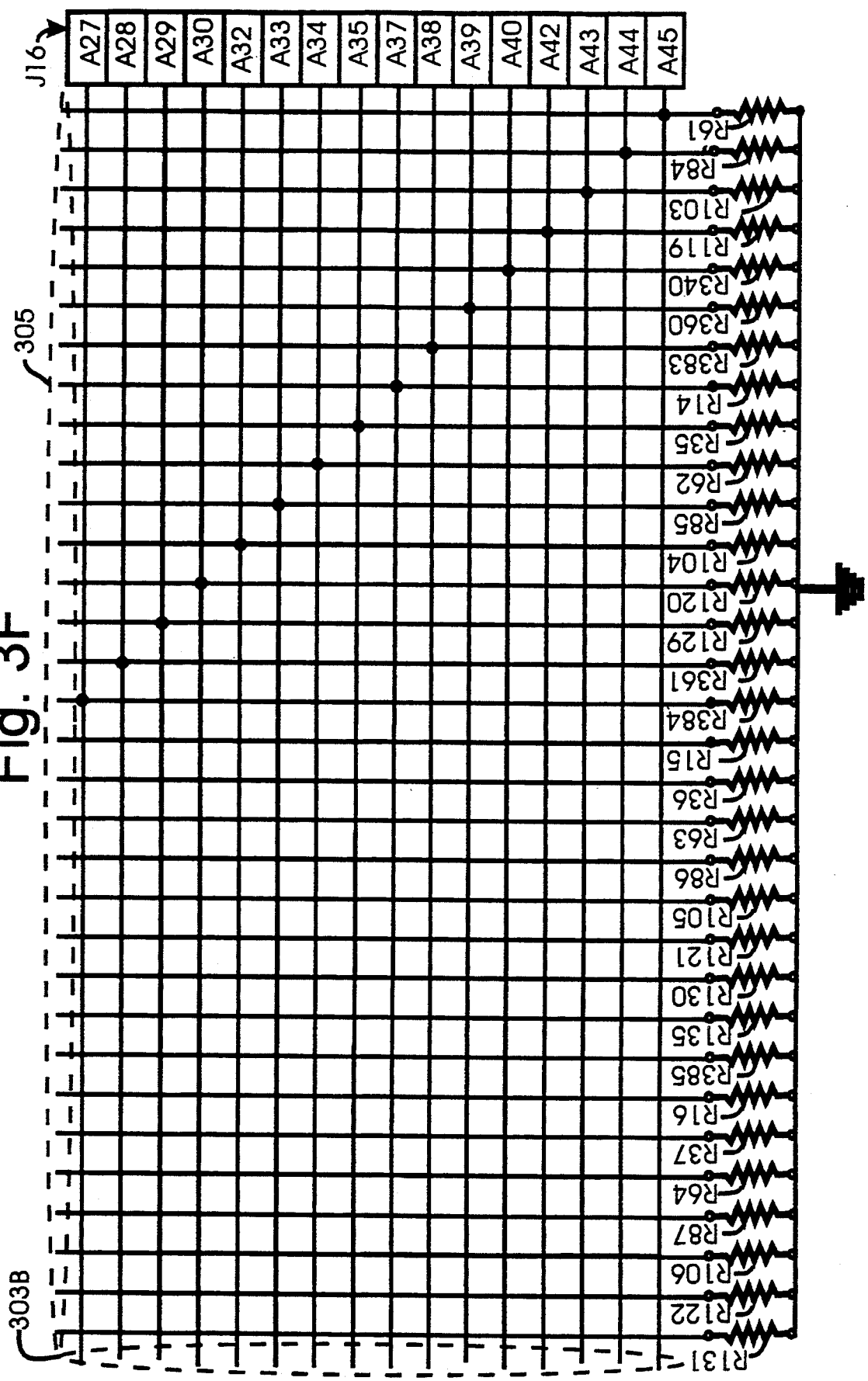

Bus conductors 303A–303B are terminated with resistors R311 and R312 shown in FIGS. 3A and 3B. Each of resistors R311 shown in FIG. 3A each has a value of 270 ohms. Each of resistors R312 shown in FIG. 3B has a value of 330 ohms. Bus conductors 303A–303B also are terminated by the resistors indicated by an "R" prefix in FIGS. 3E and 3F. Each resistor shown in FIG. 3E has a value of 270 ohms. Each resistor shown in FIG. 3F has a value of 330 ohms. The portion of packet bus 401 shown in FIGS. 3A–3F is used for the transmission of addresses and data.

Figure 4A:
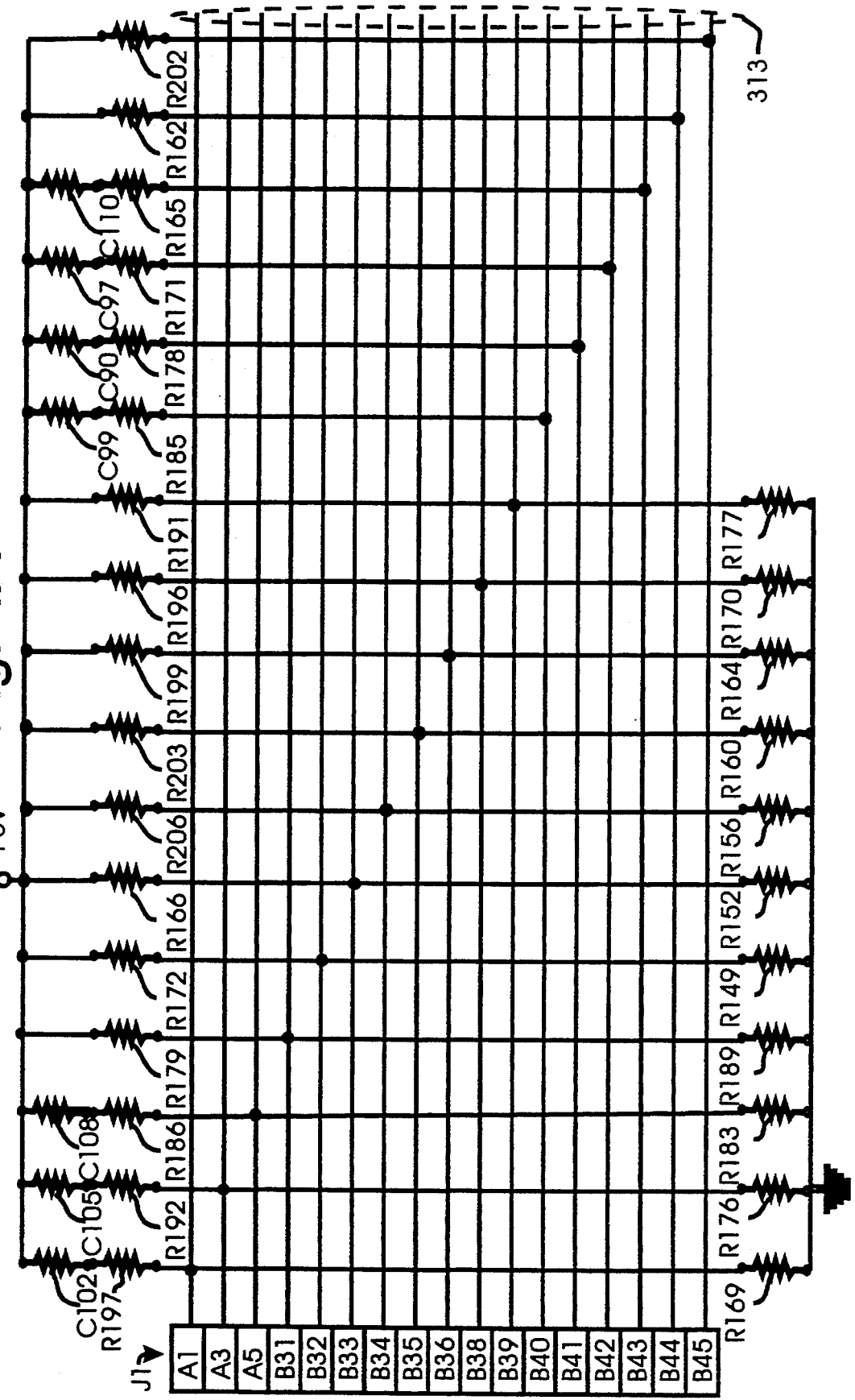
Figure 4B:
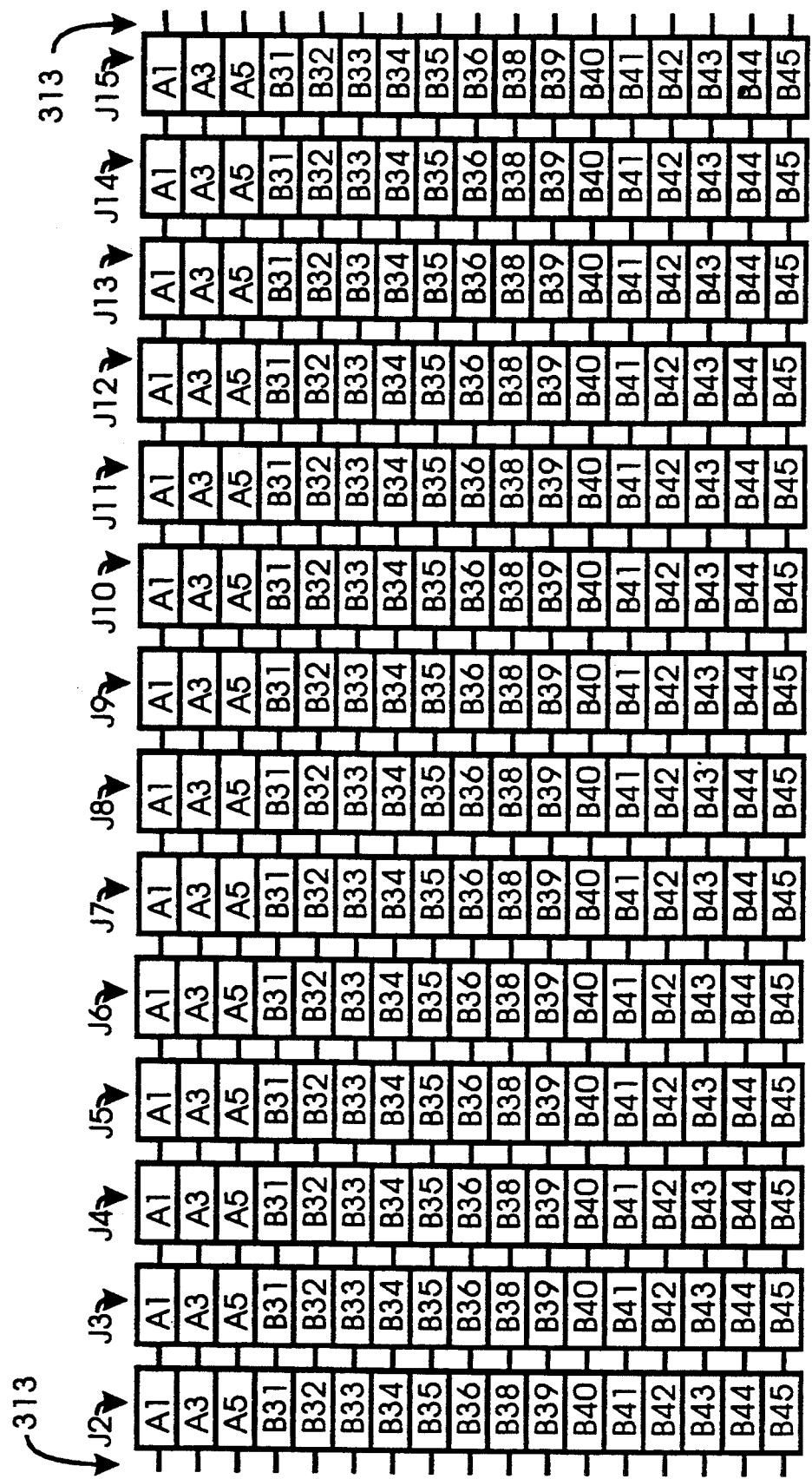

Referring to FIGS. 4A–4C, packet bus 301 also comprises bus conductors 313 that are used for transmitting control signals. As shown in FIG. 4A, conductors 313 are terminated with resistors indicated by an "R" prefix. Each of resistors R169, R176 and R183 has a value of 110 ohms. Each of resistors R197, R192 and R186 has a value of 160 ohms. Each of resistors R185, R178, R171, R165, R162 and R202 has a value of 200 ohms. Each of the remaining resistors shown in FIG. 4A has a value of 270 ohms.

The components shown in FIG. 4A indicated by the prefix "C" preferably comprise 0 ohm resistors. However, the resistors could be replaced by capacitors in order to tune the equivalent impedance of some of bus conductors 313.

Referring to FIG. 4C, each of resistors R167, R174 and R144 has a value of 110 ohms. Each of resistors R194, R183 and R181 has a value of 160 ohms. Each of resistors R180, R173, R209, R207, R204 and R200 has a value of 200 ohms. Each of the remaining resistors shown in FIG. 4C has a value of 270 ohms. The elements shown in FIG. 4C identified with a "C" prefix are preferably 0 ohm resistors. However, the resistors may be replaced by capacitors in order to tune the equivalent impedance of some of bus conductors 313.

Packet bus 301 is a 32 bit wide parallel bus used for communications between packet oriented devices, such as card 142. The packet bus is based upon the NUBUS standard. Although the 1990 NUBUS standard reduced the maximum number of boards in PC style systems to 8, the applicants have discovered that the arrangement disclosed in this application enables 16 boards to be used. This is a major improvement that enables high speed modem communication between 16 slots in a single chassis. The packet bus can operate at 10 MHz (320 Mbps), 20 MHz (640 Mbps) or 33 MHz (1 Gbps). The packet bus is only bussed along application card slots J1–J16; thus, network management card 162 does not have access to packet bus 301.

Figure 5:
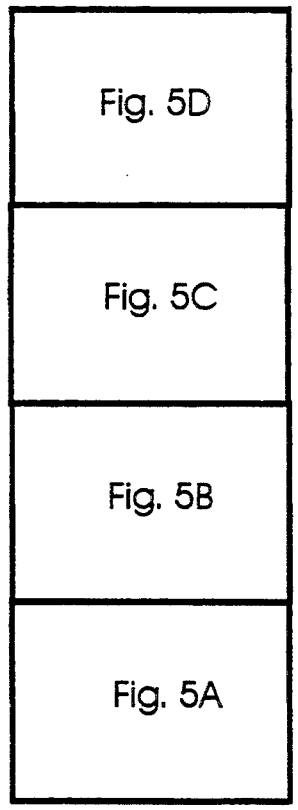
FIG. 5 illustrates the arrangement of FIGS. 5A-5D.
Figure 5B:
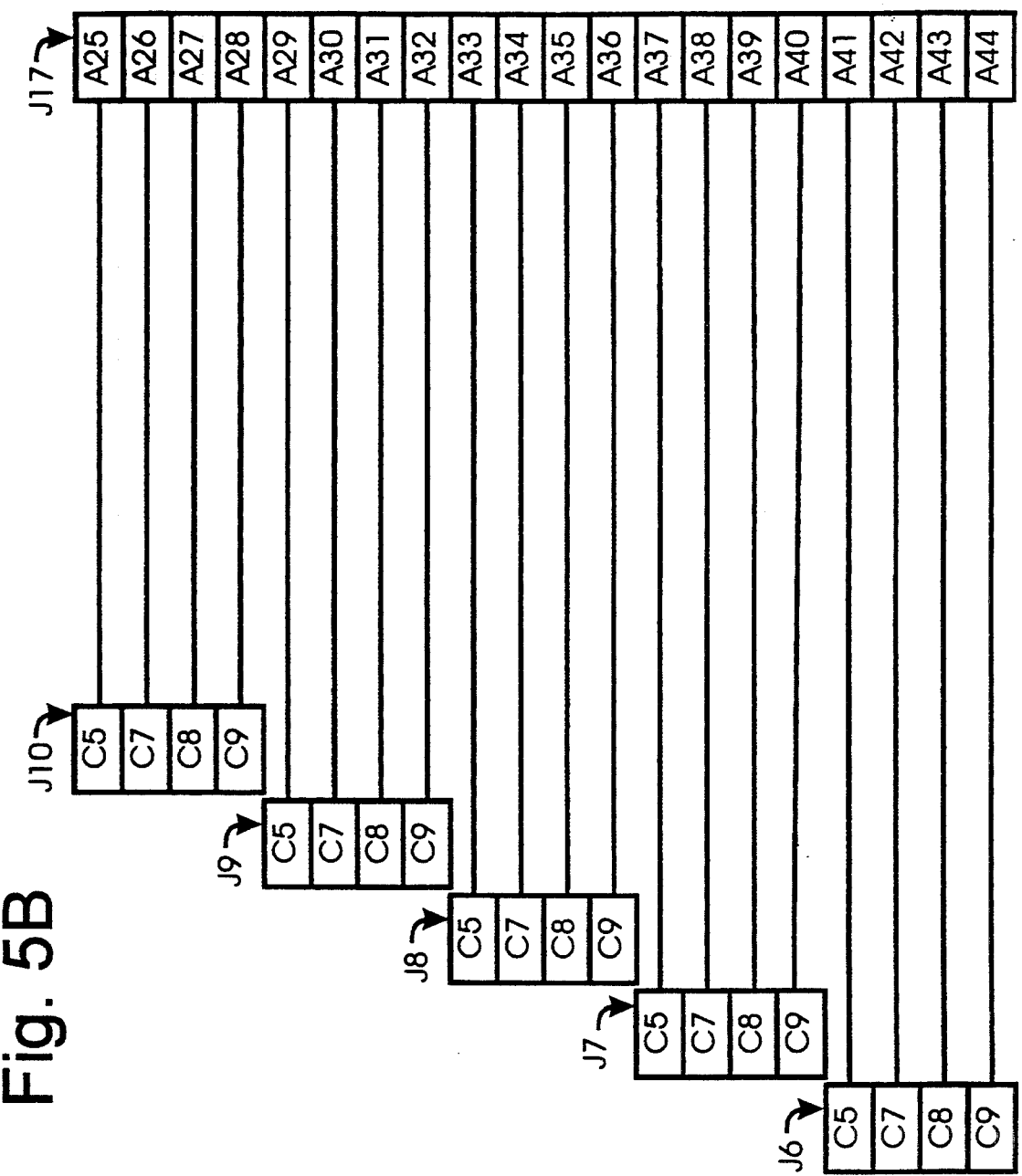
Figure 5C:
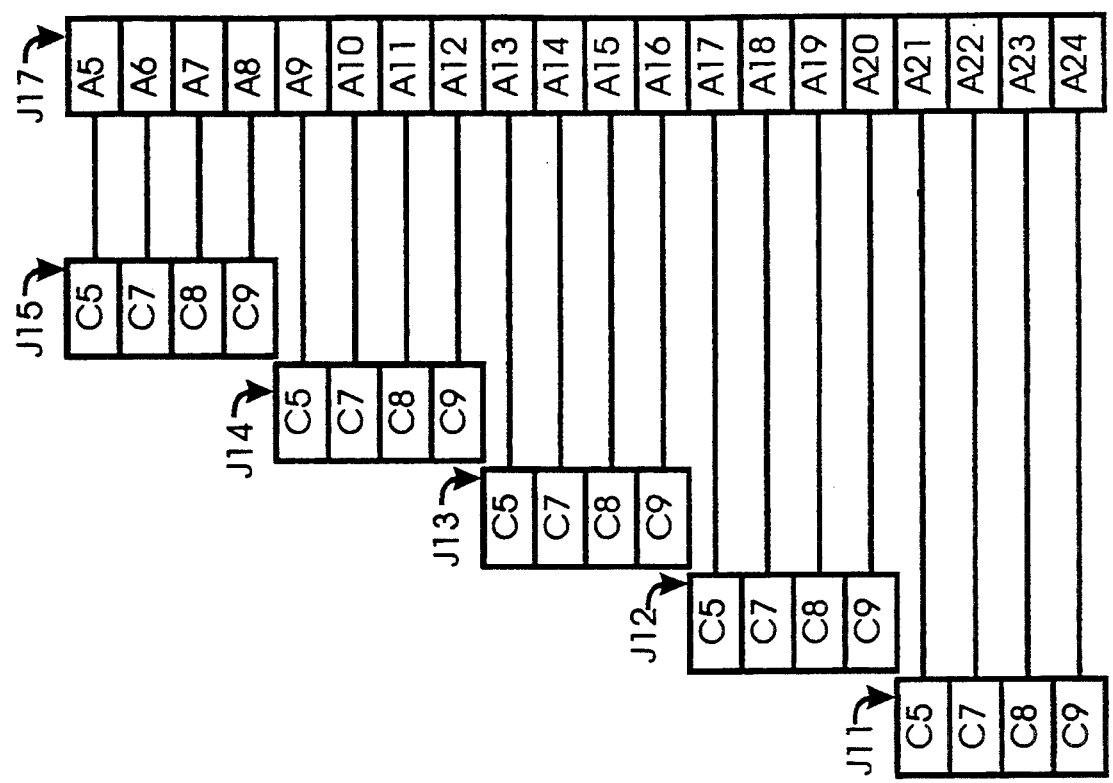

Referring to FIGS. 5A–5C, management bus 401 includes bus conductors that connect designated pins of connector J17 to designated pins of connectors J1–J16.

Figure 5D:
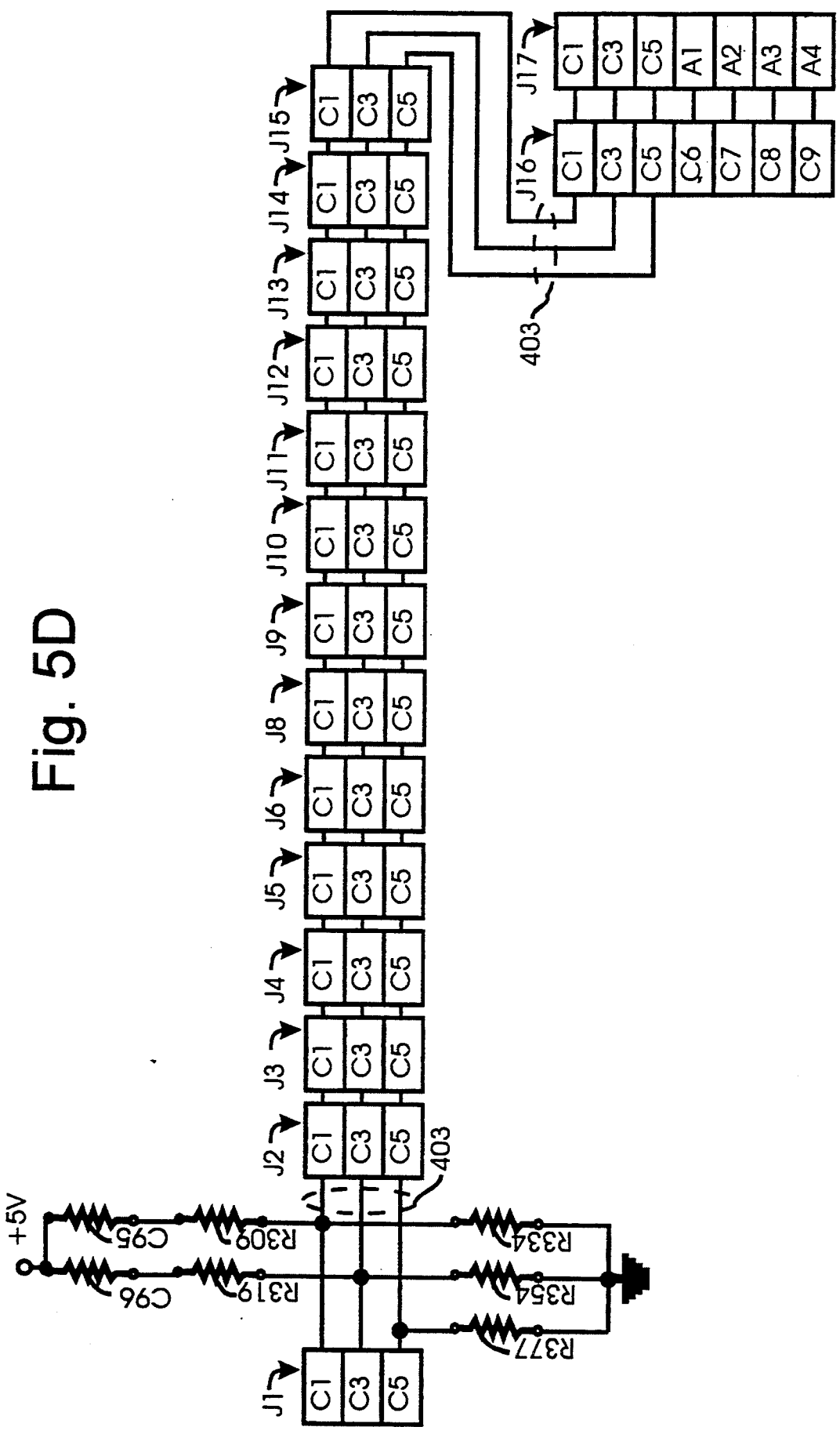

Referring to FIG. 5D, management bus 401 also comprises bus conductors 403 that connect designated pins of connectors J1–J17. Terminating resistors for conductors 403 are designated by an "R" prefix. Resistors R319 and R309 have a value of 330 ohms. Resistors R354 and R334 have a value of 470 ohms. Resistor R377 has a value of 510 ohms. Elements C95 and C96 preferably are 0 ohm resistors. However, the resistors could be replaced by capacitors to tune the equivalent impedance of some of conductors 403.

Network management bus 401 contains two sets of lines. One set is used to communicate with network application cards (NACs) and the other set is used to communicate with network interface cards (NICs). Both sets of signal lines are asynchronous serial data paths which allow NMC 162 to configure, query, test, etc. application cards.

The NAC management bus provides a dedicated 512 Kbps full duplex serial channel from NMC 162 to each NAC slot. Each channel supports a full duplex hardware flow control signal to throttle management bus traffic automatically without processor intervention. The communication is performed using an async data format but is accompanied by a 512 KHz data clock and a flow control strobe. NMC 162 uses this bus to communicate to all application cards for the purpose of network management.

The NIC management bus provides a dedicated serial channel from the NMC to each NIC and a common serial channel from all NICs to NMC 162. This bus is used to manage intelligent NICs containing a microprocessor and UART interface. Communication on the NIC management bus consists of half duplex asynchronous TTL data at a maximum speed of 57.6 Kbps. The conventional NIC management bus speed, however, is 9600 bps.

Figure 6:
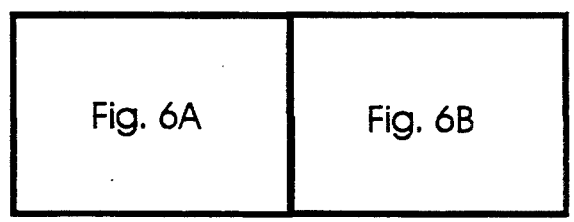
FIG. 6 illustrates the arrangement of FIGS. 6A-6B.
Figure 6B:
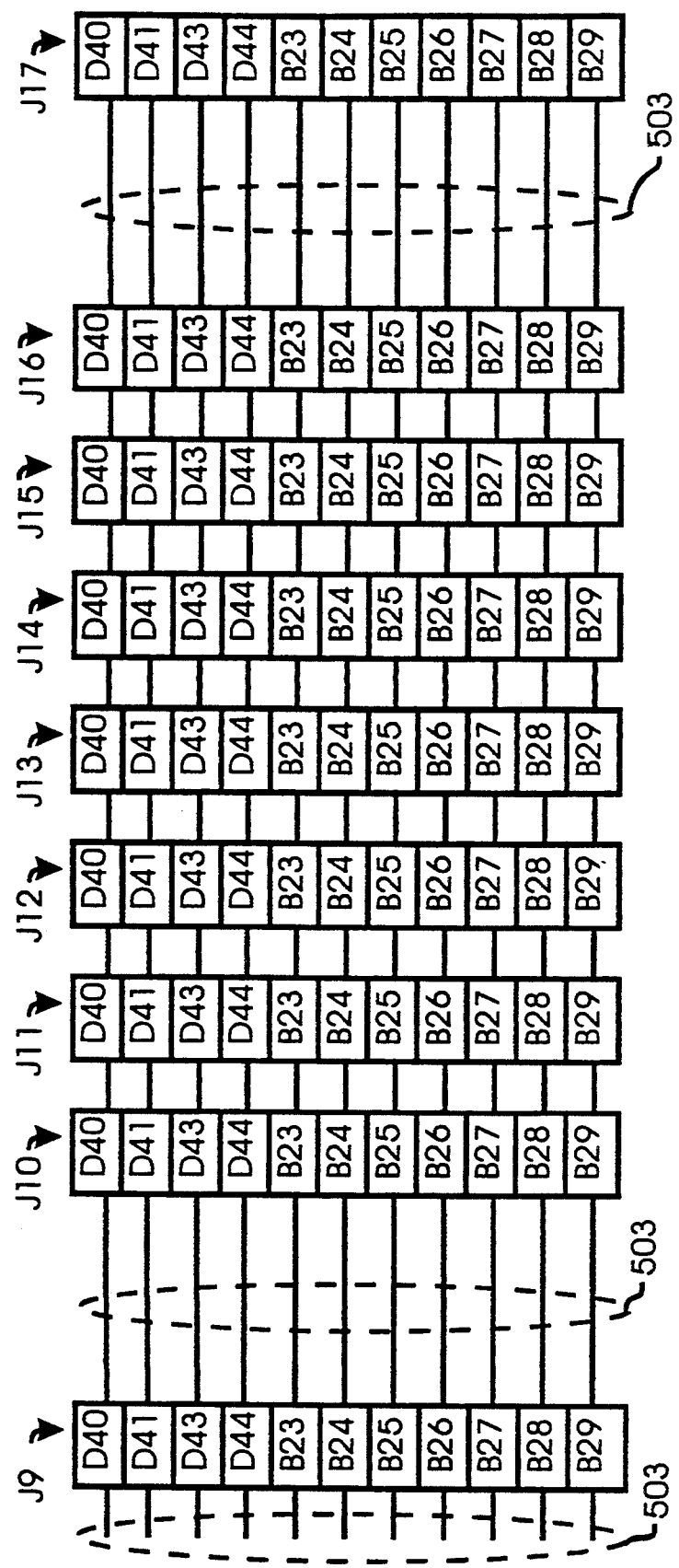

Referring to FIGS. 6A–6B, general purpose bus 501 includes bus conductors 503 that connect designated pins of connectors J1–J17.

Figure 7:
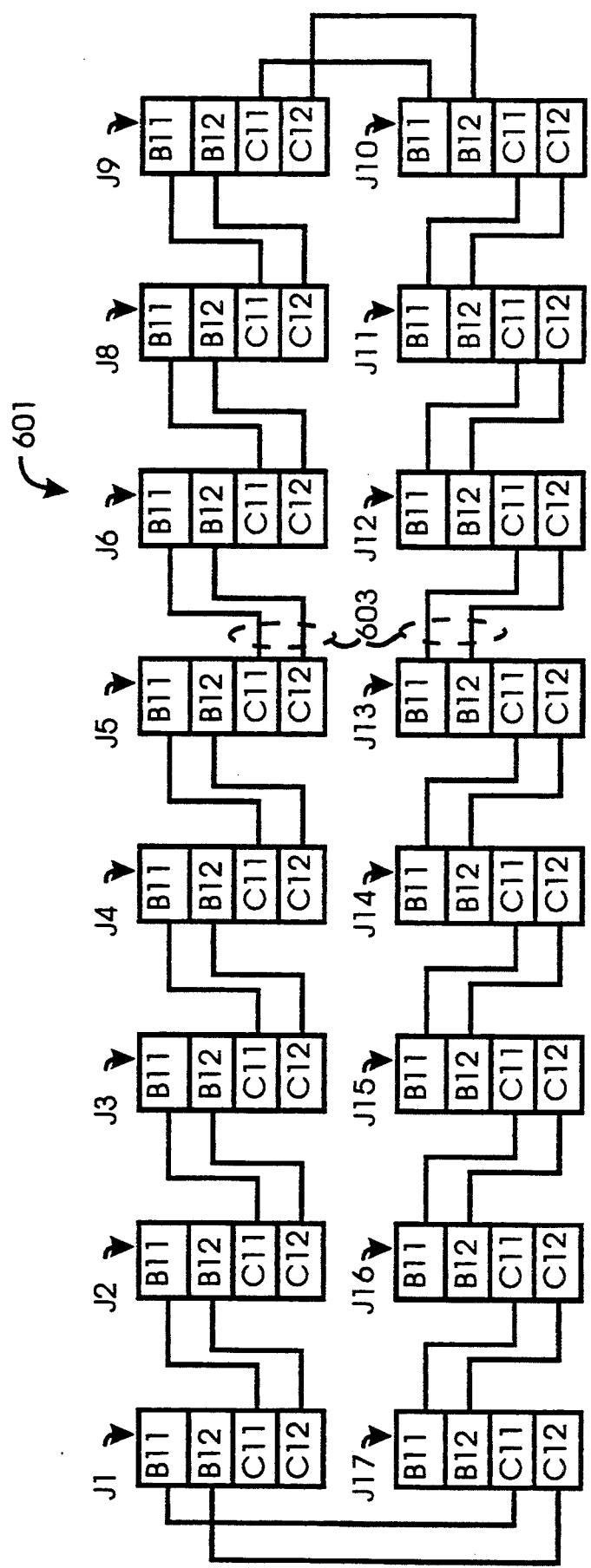
FIG. 7 is a schematic diagram of a preferred form of ring bus suitable for use in connection with the invention.

Referring to FIG. 7, ring bus 601 comprises bus conductors 603 that connect designated pins of connectors J1–J17 as shown.

General purpose bus 501 and ring bus 601 are not interconnected with the components shown in FIG. 1. However, they could be used for alternative embodiments or for additional circuitry, if required.

General purpose bus 501 and ring bus 601 are parallel signal tracks that are bussed to all slots. These bussed signals are high speed lines. Busses 501 and 601 can be clocked at 33 MHz.

Bus 501 may be used for an Ethernet bus. In this case, 5 pins of bus 501 are assigned the signals required for a local Ethernet bus which may also be attached to an external network.

Referring to FIG. 7, ring bus 601 uses four pins of each connector slot to form a daisy chain ring bus. Each connector is assigned two input pins and two output pins. The two output pins of one connect are tied to the input pins of next connector and so on down the backplane. Each application card on the ring bus is responsible for routing its input pair to the output pair on the same connector so that the chain is not broken. The two output pins on slot 17 can be connected to the two input pins on slot 1 by populating 0 ohm resistors on the backplane. This would allow a dual counter-rotating ring topology to be created.

Segmentation of bus 601 can be achieved by leaving a space between card slots. This will ensure that multiple chained busses are isolated from one another. These lines will not be terminated on the backplane.

Figure 8:
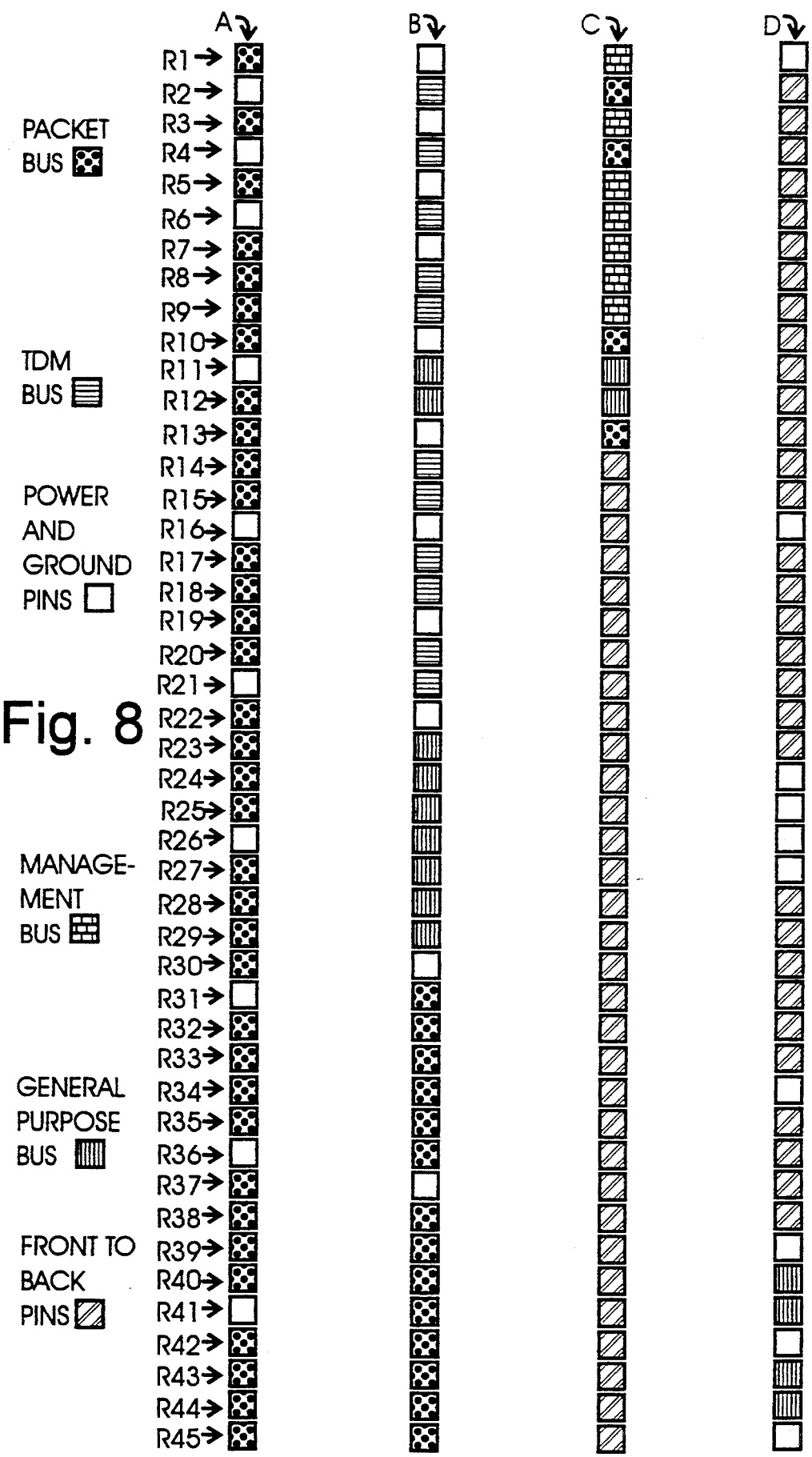
FIG. 8 is a schematic diagram of a preferred form of connector array suitable for use in connection with the NAC cards shown in FIG. 1.

FIG. 8 illustrates a preferred embodiment of the pin connections for connectors J1–J16. These connectors are used for all of the cards shown in FIG. 1 with the exception of network management card 162. As shown in FIG. 8, the pins are arranged in four columns with 45 pins in each column. Rows of the pins are indicated by an "R" prefix and columns are indicated by the letters "A–D". Similar nomenclature is used in FIGS. 2–7 to indicate pins of connectors J1–J17. For example, in FIG. 2A, the top pin on connector J1 marked "B2" indicates a connection to the pin in row R2, column B of connector J1.

The unique pin arrangement shown in FIG. 8 offers a number of advantages. For example, each of columns A–D excludes pins connected to one of the packet bus, TDM bus or management bus. Column A excludes pins connected to each of the data busses other than the packet bus. Column B excludes pins connected to the management bus. Column C excludes pin connected to the TDM bus. Pins in column D exclude connections to all of the data busses with the exception of the general purpose bus. As a result, connectors of a circuit board requiring no connection to one of the busses can omit a column of connectors corresponding to that bus and still provide a useful electrical connection. Column D can never be omitted since it provides power connections.

The connection of the busses to the various pins shown in FIG. 8 is an important feature of the preferred embodiment which accomplishes several important goals. The pin arrangement achieves separation of high speed digital signals from lower speed signals. For example, the higher speed packet bus pins are generally in column A, whereas the lower speed management bus pins are generally in column C. The medium speed TDM bus pins are located in column B. The power and ground pins are located for interdigital isolation of high speed signals. The organization of the pins allows plug-in cards to use either 180 pin, 135 pin or 90 pin connectors using only the subset of bus signals required in a given application.

Figure 9:
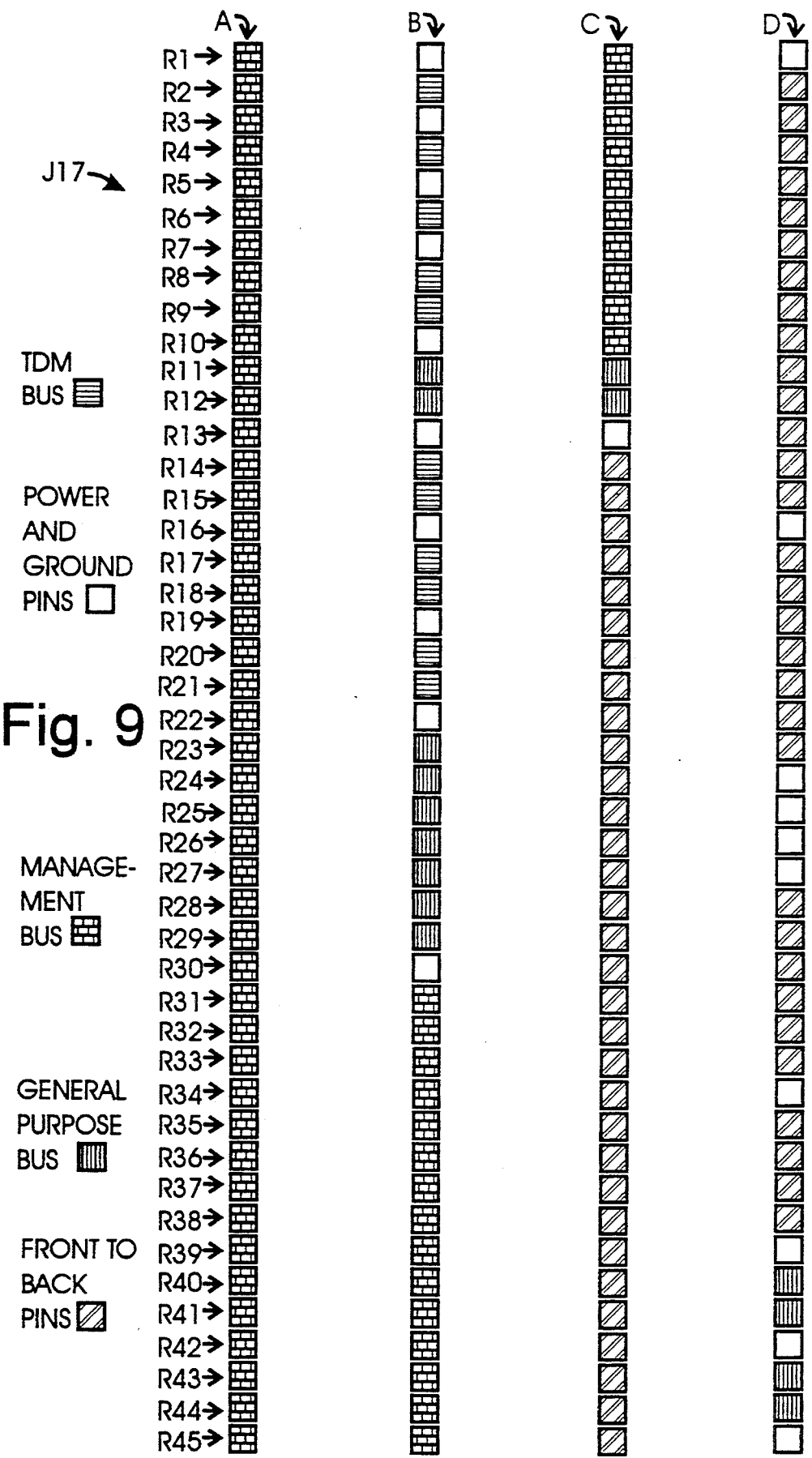
FIG. 9 is a schematic diagram of a preferred form of connector array suitable for use in connection with the NMC card shown in FIG. 1.

FIG. 9 illustrates the connection of the pins in connector J17 to the various busses of backplane BP. Connector J17 receives network management card 162 (FIG. 1). The pins for connector J17 shown in FIG. 9 include 45 rows (R1–R45) and four columns (A, B, C and D). As shown in FIG. 9, connector J17 includes dedicated management lines to each of application slots J1–J16 for the purpose of network management. The pin arrangement of connector J17 accomplishes the same objectives described previously in connection with FIG. 8.

Figure 10:
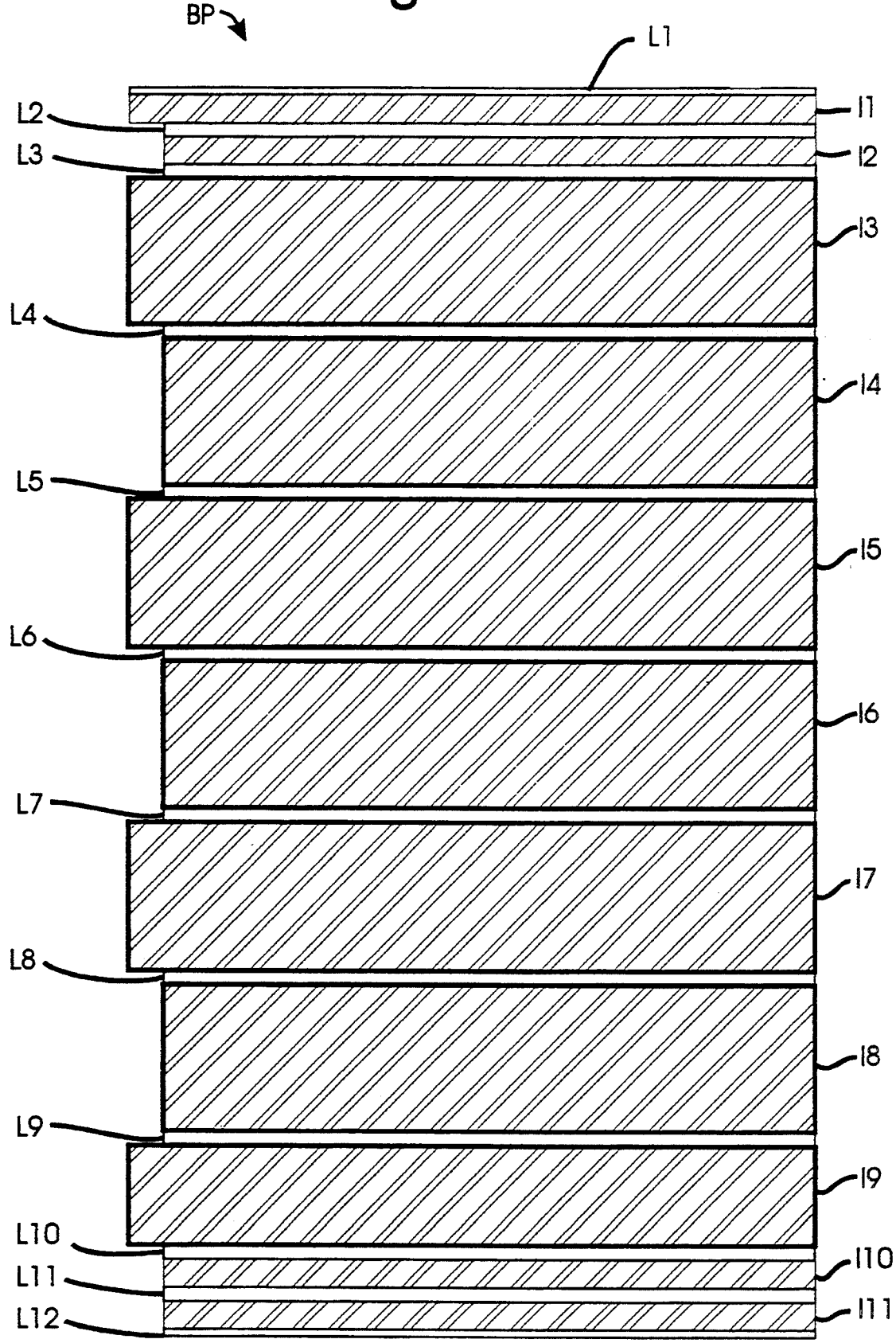
FIG. 10 is an exploded schematic diagram of a preferred form of backplane suitable for use in connection with the invention, showing the layers of the backplane.

FIG. 10 illustrates the preferred layer stackup of the printed circuit board (PCB) of backplane BP. L1 and L12 are copper foil layers for mounting various external components and for carrying signal traces. L2–L11 are copper foil layers which define various busses. Layers L1 and L12 each have a nominal thickness of 0.007 inch; layers L2–L11 each have a thickness of 0.014 inch. The signal traces on layers L2–L11 have a nominal width of 0.008 inch.

L2 is a power plane layer carrying busses for supplying ±12 volts. L3 carries the portions of management bus 401 shown in FIGS. 5B, 5C and 5D. L4 is a power plane layer carrying busses for supplying +5 volts. L5 carries the portions of packet bus 301 shown in FIGS. 4A–4C connected to pins B31–B36 and B38–B45. L6 is a ground plane layer. L7 carries the portions of packet bus 301 shown in FIGS. 4A–4C connected to pins A1, A3 and A5. L8 is a ground plane layer. L9 carries TDM bus 201, general purpose bus 501 and/or ring bus 601. L10 is a power plane layer carrying busses for supplying ±12 volts. L11 carries the portions of management bus 401 shown in FIG. 5A.

Dielectric insulating layers I1–I11 have the following nominal thicknesses:

| Insulating Layer | Thickness in Thousandths of an Inch |
| --- | --- |
| I1 | 5.2 |
| I2 | 5.0 |
| I3 | 26.2 |
| I4 | 25.0 |
| I5 | 26.2 |
| I6 | 25.0 |
| I7 | 26.2 |
| I8 | 25.0 |
| I9 | 17.0 |
| I10 | 5.0 |
| I11 | 5.2 |

During fabrication, the nominal thicknesses of layers L1–L2 and I1–I11 are reduced somewhat.

The resistors shown in FIGS. 3A, 3B, 3E, 3F, 4A, 4C and 5D are distributed between layers L1 and L12.

The dielectric thicknesses, signal trace width and height, and the arrangement of the busses in the various layers are important features of the preferred embodiment which enable the busses to operate at optimum speed. The combination of the layers shown in FIG. 10 and the terminating elements of the various busses shown in FIGS. 2–5 enable communications between the busses, the modems and the other cards shown in FIG. 1 at a speed not realized by the prior art arrangements.

Those skilled in the art will recognize that the preferred embodiment may be altered and modified without departing from the true spirit and scope of the invention as defined in the accompanying claims.

We claim:

1. In a modem system comprising a plurality of modems for modulating and demodulating data, transmitting said data via at least one telephone line and via at least one network, improved backplane apparatus for transmitting signals to and from said modems comprising in combination:

first bus means for management signal communication with said modems at a predetermined first data rate;
second bus means for transmitting data between said telephone line and said modems at a predetermined second data rate greater than said first data rate;
third bus means for transmitting data between said modems and said network at a predetermined third data rate greater than said second data rate;
fourth bus means for distributing DC power and ground potential;
first impedance means for terminating said first bus means;
second impedance means for terminating said second bus means;
third impedance means for terminating said third bus means;
means for spacing said first bus means, said second bus means, said third bus means and said fourth bus means in layers in said backplane dependent on the data rate of said bus means;
a plurality of connector means for interconnecting circuit boards with said first bus means, said second bus means, said third bus means and said fourth bus means, each said connector means comprising an array of connectors arranged in rows and columns;
means for coupling said connectors to said first bus means, said second bus means, said third bus means and said fourth bus means according to a predetermined pattern dependent on the data rate of said bus means, whereby the number of connector means coupled to said first, second and third bus means can be increased.

2. Apparatus, as claimed in claim 1, wherein one of said columns of said connectors excludes connections to one of said first, second and third bus means, whereby a connector of a circuit board requiring no connection to said one bus means can omit a column of connectors corresponding to said one column.

3. Apparatus, as claimed in claim 1, wherein said second bus means is segmented, whereby the bandwidth of said second bus means is increased.

4. Apparatus, as claimed in claim 1, and further comprising fifth bus means capable of transmitting data at a predetermined fourth data rate greater than said second data rate.

5. Apparatus, as claimed in claim 4, wherein said fifth bus means is segmented, whereby the bandwidth of said fifth bus means is increased.

6. Apparatus, as claimed in claim 1, wherein said first impedance means comprises pairs of resistors, one resistor in each pair having a value between 300 and 400 ohms and the other resistor in each pair having a value between 400 and 500 ohms.

7. Apparatus, as claimed in claim 6, wherein said second impedance means comprises pairs of resistors, one resistor in each pair having a value between 200 and 300 ohms and the other resistor is each pair having a value between 400 and 500 ohms.

8. Apparatus, as claimed in claim 7, wherein said third impedance means comprises a first set of pairs of resistors, each resistor in said pairs of said first set having a value between 200 and 300 ohms, said third impedance means also comprising a second set of pairs of resistors, one resistor in each pair of said second set having a value between 200 and 300 ohms and the other resistor in each pair of said second set having a value between 300 and 400 ohms.

9. Apparatus, as claimed in claim 1, wherein said means for spacing comprises:

first layer means for carrying external components and signal traces of said backplane;
second layer means for carrying at least a portion of said fourth bus means;
third layer means for carrying a first portion of said first bus means;
fourth layer means for carrying at least a portion of said fourth bus means;
fifth layer means for carrying a first portion of said third bus means;
sixth layer means for carrying at least a portion of said fourth bus means;
seventh layer means for carrying a second portion of said third bus means;
eighth layer means for carrying at least a portion of said fourth bus means;
ninth layer means for carrying said second bus means;
tenth layer means for carrying at least a portion of said fourth bus means;
eleventh layer means for carrying a second portion of said first bus means; and
twelfth layer means for enabling solder connections.

10. Apparatus, as claimed in claim 9, wherein said means for spacing comprises:

a first insulating dielectric layer located between said first and second layer means;
a second insulating dielectric layer located between said second and third layer means;
a third insulating dielectric layer located between said third and fourth layer means;
a fourth insulating dielectric layer located between said fourth and fifth layer means;
a fifth insulating dielectric layer located between said fifth and sixth layer means;
a sixth insulating dielectric layer located between said sixth and seventh layer means;
a seventh insulating dielectric layer located between said seventh and eighth layer means;
an eighth insulating dielectric layer located between said eighth and ninth layer means;

a ninth insulating dielectric layer located between said ninth and tenth layer means;

a tenth insulating dielectric layer located between said tenth and eleventh layer means; and an eleventh insulating dielectric layer located between said eleventh and twelfth layer means.

11. Apparatus, as claimed in claim 10, wherein said third, fourth, fifth, sixth, seventh and eighth insulating dielectric layers each comprise a dielectric layer between 0.025 and 0.027 inch thick, wherein said ninth insulating dielectric layer comprises a dielectric layer between 0.016 and 0.018 inch thick, and wherein said first, second, tenth and eleventh insulating dielectric layers each comprise a dielectric layer between 0.005 and 0.007 inch thick.

12. Apparatus, as claimed in claim 4, wherein said array of connectors comprises a first column, a second column, a third column and a fourth column and wherein said first column comprises connectors coupled to said third bus means and said fourth bus means and excludes connectors coupled to said first, second and fifth bus means.

13. Apparatus, as claimed in claim 12, wherein said second column comprises connectors coupled to said second, third, fourth and fifth bus means and excludes connectors coupled to said first bus means.

14. Apparatus, as claimed in claim 13, wherein said third column comprises connectors coupled to said first, third and fifth bus means and excludes connectors coupled to said second and fourth bus means.

15. Apparatus, as claimed in claim 14, wherein said fourth column comprises connectors coupled to said fourth and fifth bus means and excludes connectors coupled to said first, second and third bus means.

* * * * *